United States Patent
Stacey et al.

(10) Patent No.: US 11,659,412 B2
(45) Date of Patent: May 23, 2023

(54) METHODS AND APPARATUS TO GENERATE AND PROCESS MANAGEMENT FRAMES

(71) Applicant: Intel Corporation, Santa Clara, CA (US)

(72) Inventors: Robert Stacey, Portland, OR (US); Yaron Alpert, Hod Hasharon (IL); Laurent Cariou, Portland, OR (US); Po-Kai Huang, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 281 days.

(21) Appl. No.: 17/252,196

(22) PCT Filed: Aug. 2, 2018

(86) PCT No.: PCT/US2018/045025
§ 371 (c)(1),
(2) Date: Dec. 14, 2020

(87) PCT Pub. No.: WO2020/027847
PCT Pub. Date: Feb. 6, 2020

(65) Prior Publication Data
US 2021/0258806 A1    Aug. 19, 2021

(51) Int. Cl.
*H04W 24/02* (2009.01)
*H04W 72/04* (2023.01)
*H04W 72/0453* (2023.01)

(52) U.S. Cl.
CPC ....... *H04W 24/02* (2013.01); *H04W 72/0453* (2013.01)

(58) Field of Classification Search
None
See application file for complete search history.

(56) References Cited

U.S. PATENT DOCUMENTS

| 10,117,168 B2* | 10/2018 | Seok ............ H04W 74/08 |
| 2012/0224612 A1 | 9/2012 | Kim et al. |

(Continued)

FOREIGN PATENT DOCUMENTS

| WO | 2005/015839 A1 | 2/2005 |
| WO | 2014007576 | 1/2014 |
| WO | 2017146431 | 8/2017 |

OTHER PUBLICATIONS

International Searching Authority, "International Search Report," dated May 2, 2019 in connection with International Patent Application No. PCT/US2018/045025, 3 pages.

(Continued)

*Primary Examiner* — Saba Tsegaye
(74) *Attorney, Agent, or Firm* — Hanley, Flight & Zimmerman, LLC

(57) ABSTRACT

Methods, apparatus, systems and articles of manufacture are disclosed to generate a management frame identifying an operation mode for a basic service set of a local area network. An example disclosed method includes performing an assessment of a wireless network and determining an operation mode for a basic service set (BSS) bandwidth based on the assessment, the operation mode indicating continuity of a primary segment, a secondary segment, a tertiary segment and a quaternary segment. The example method further includes creating a management frame including information fields based on the BSS bandwidth, the information fields including a first channel width field, a second channel width field, a third channel width field, a first center frequency field, a second center frequency field and a third center frequency field and transmitting the management frame over the wireless network.

20 Claims, 17 Drawing Sheets

(56) References Cited

U.S. PATENT DOCUMENTS

| | | | |
|---|---|---|---|
| 2017/0171796 A1 | 6/2017 | Wu et al. | |
| 2018/0124866 A1* | 5/2018 | Asterjadhi | ........ H04W 72/0453 |
| 2018/0139781 A1 | 5/2018 | Park et al. | |
| 2020/0015219 A1* | 1/2020 | Asterjadhi | ............ H04W 28/20 |

OTHER PUBLICATIONS

International Searching Authority, "Written Opinion," dated May 2, 2019 in connection with International Patent Application No. PCT/US2018/045025, 5 pages.

Chu et al., "11ax D2.0 BSS Operation BW", IEEE 802.11-18/0795r2, May 8, 2018, 4 pages.

Patil et al., Resolution for CIDs related to BSS Color, IEEE 802.11-18/1244r1, Jul. 11, 2018, 8 pages.

Intellectual Property India, "Examination Report", issued in connection with Indian Patent Application No. 202047052530 dated Mar. 21, 2022, 7 pages (English Translation Included).

European Patent Office: "Extended Search Report," issued in corresponding European Patent Application No. 18928937.4-1212 dated Feb. 21, 2022, 13 pages.

International Bureau: "International Preliminary Report on Patentability," issued in corresponding International Patent Application No. PCT/US2018/045025 dated Feb. 2, 2021, 6 pages.

Laurent Cariou (Intel): "EXtreme Throughput (XT) 802.11," IEEE Draft; 11-18-0789-10-OWNG-EXTREME-THROUGHPUT-802-11, IEEE-SA Mentor; Piscataway, NJ, vol. 802.11 WNG, No. 10, May 8, 2018, pp. 1-15, XP068125937.

\* cited by examiner

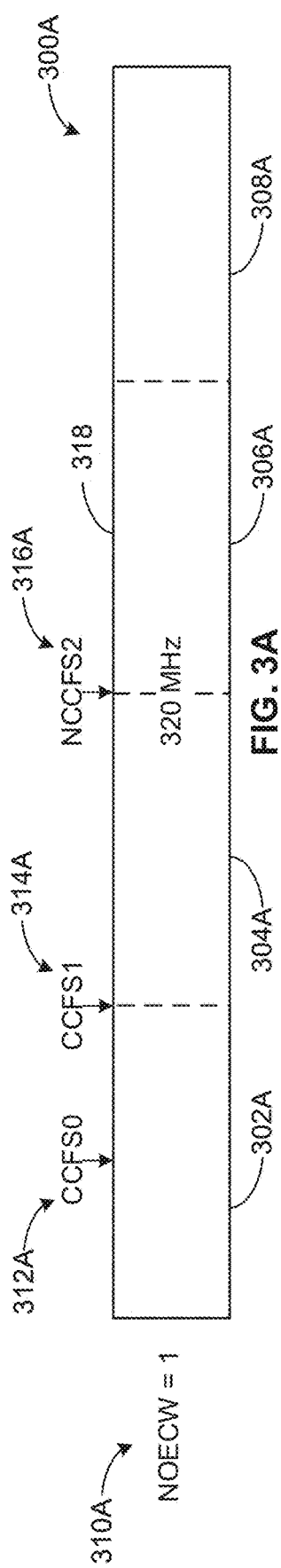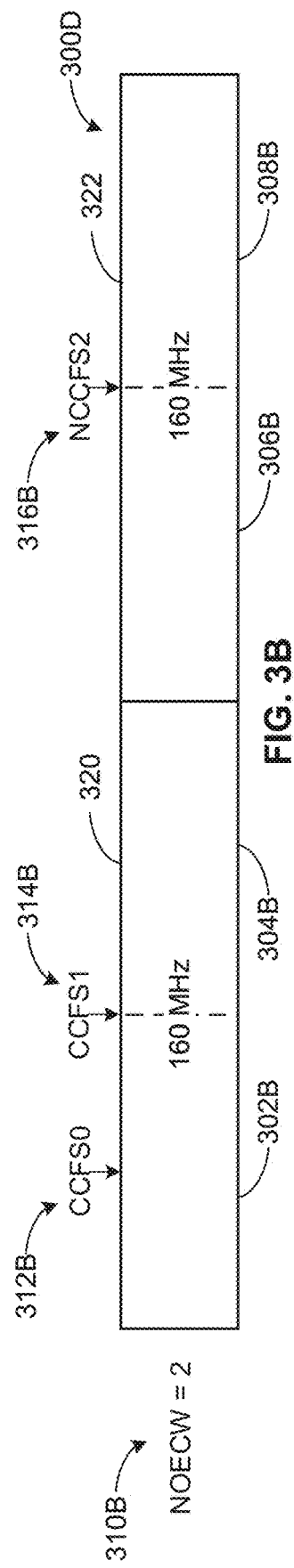

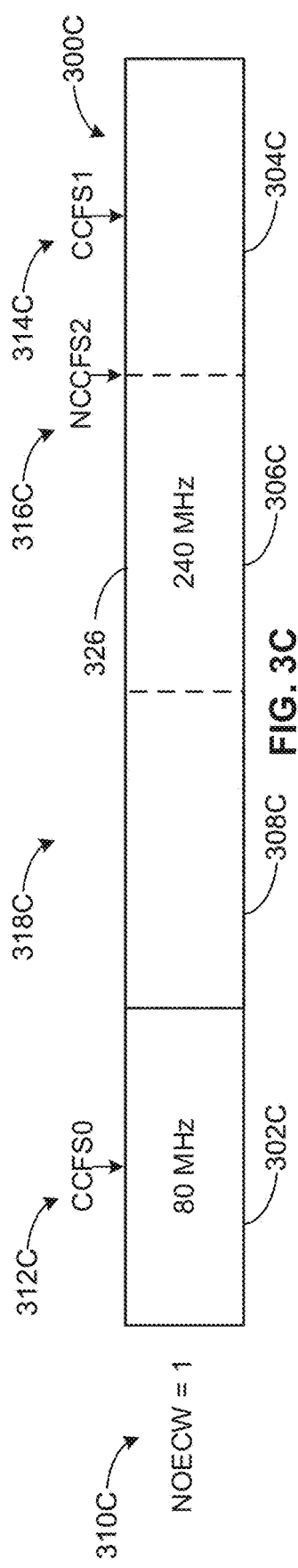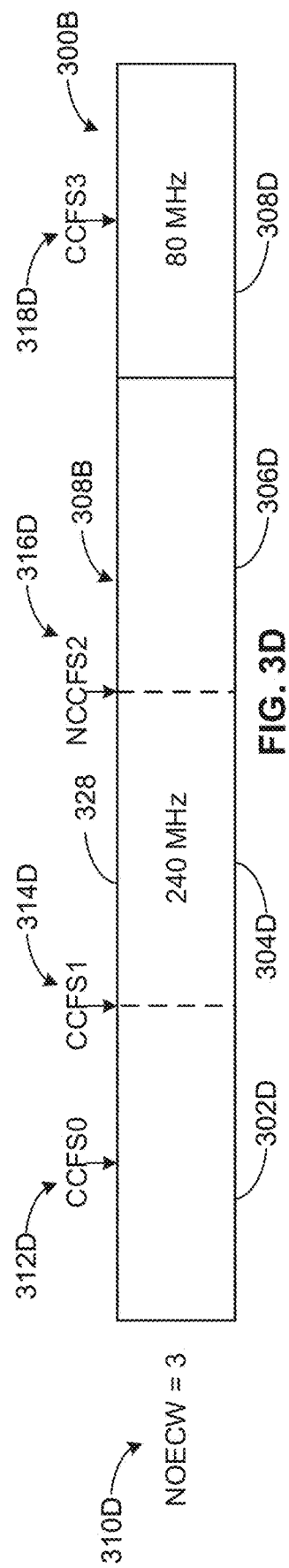

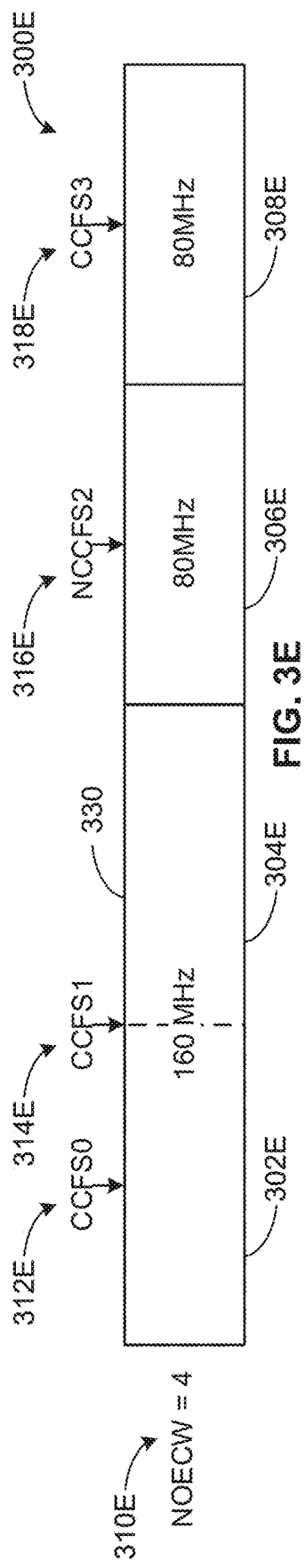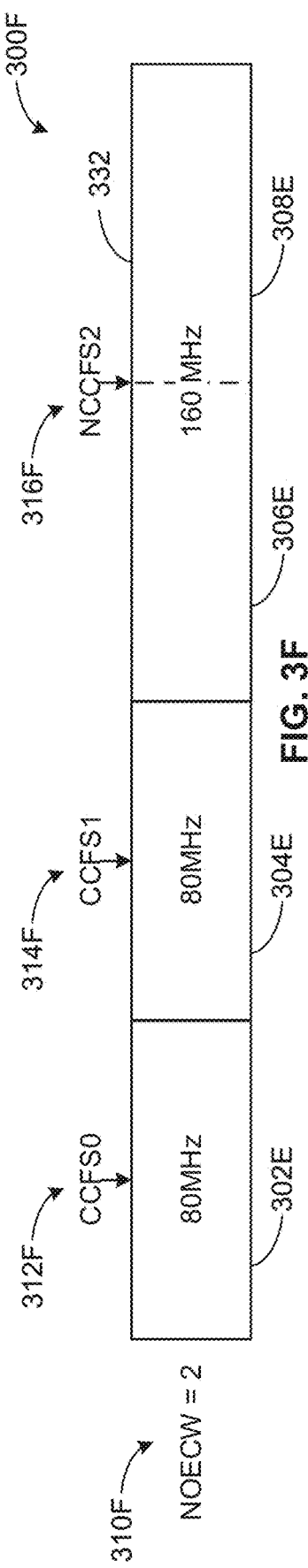

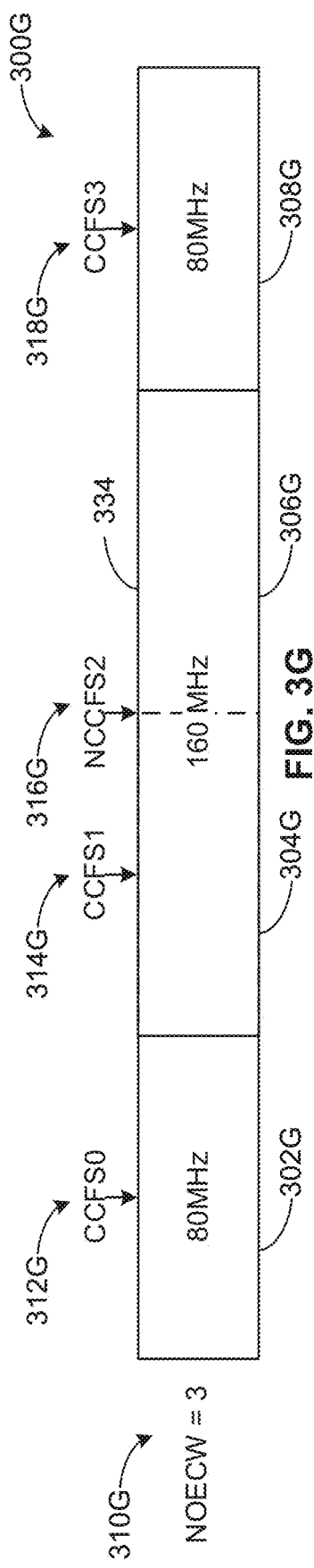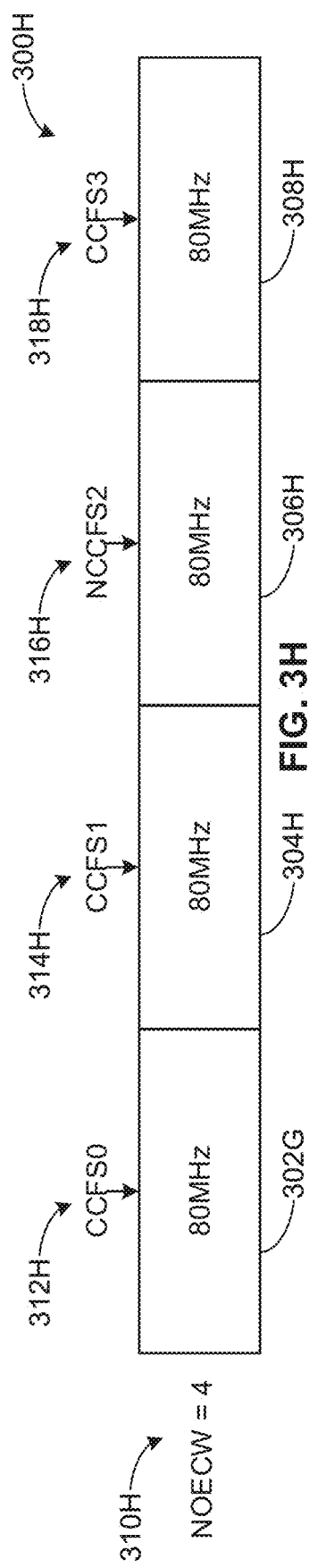

METHODS AND APPARATUS TO GENERATE AND PROCESS MANAGEMENT FRAMES

RELATED APPLICATION

This patent arises from a 371 Nationalization of International Patent Application Serial No. PCT/US18/45025, which is entitled "METHODS AND APPARATUS TO GENERATE AND PROCESS MANAGEMENT FRAMES," and which was filed on Aug. 2, 2018, the subject matter of which is expressly incorporated herein by reference in its entirety.

FIELD OF THE DISCLOSURE

This disclosure relates generally to communication between access points and stations, and, more particularly, to methods and apparatus to generate and process management frames.

BACKGROUND

Many locations provide Wi-Fi to connect Wi-Fi enabled devices to networks such as the Internet. Wi-Fi enabled devices include personal computers, video-game consoles, mobile phones and devices, tablets, smart televisions, digital audio player, etc. Wi-Fi allows Wi-Fi enabled devices to wirelessly access the Internet via a wireless local area network (WLAN). To provide Wi-Fi connectivity to a device, a Wi-Fi access point transmits a radio frequency Wi-Fi signal to the Wi-Fi enabled device within the signal range of the access point (e.g., a hot spot, a modem, etc.). A Wi-Fi access point periodically sends out a beacon frame which contains information that allows Wi-Fi enabled devices to identify, connect to and transfer data to the access point.

Wi-Fi is implemented using a set of media access control (MAC) and physical layer (PHY) specifications (e.g., such as the Institute of Electrical and Electronics Engineers (IEEE) 802.11 protocol). Devices (e.g., access points and Wi-Fi enabled devices) able to operate using IEEE 802.11 protocol are referred to as stations (STA).

BRIEF DESCRIPTION OF THE DRAWINGS

FIGS. 3A-3H are examples of four segment operation modes and corresponding example values of an associated management frame including center frequency and channel width fields.

The figures are not to scale. In general, the same reference numbers will be used throughout the drawing(s) and accompanying written description to refer to the same or like parts.

DETAILED DESCRIPTION

Various locations (e.g., homes, offices, coffee shops, restaurants, parks, airports, etc.) may provide Wi-Fi to the Wi-Fi enabled devices (e.g., STAs) to connect the Wi-Fi enabled devices to the Internet, or any other network, with minimal hassle. The locations may provide one or more Wi-Fi access points (APs) to output Wi-Fi signals to the Wi-Fi enabled devices within a range of the Wi-Fi signals (e.g., a hotspot). A Wi-Fi AP is structured to wirelessly connect a Wi-Fi enabled device to the Internet through a wireless local area network (WLAN) using Wi-Fi protocols (e.g., such as IEEE 802.11). The Wi-Fi protocol is the protocol for how the AP communicates with the devices to provide access to the Internet by transmitting uplink (UL) transmissions and receiving downlink (DL) transmissions to/from the Internet. Wi-Fi protocols describe a variety of management frames (e.g., beacon frames, trigger frames, etc.) that facilitate the communication between access points and stations.

Current generation Wi-Fi devices operation in one or both of a 5 gigahertz (GHz) frequency band or 2.4 GHz frequency band. Larger operating bands allow Wi-Fi devices to potentially transmit at greater bandwidths. Current Wi-Fi protocols (e.g., IEEE 802.11ac) have a maximum allowable bandwidth of 160 megahertz (MHz). However, because different portions of the operating band of the 5 GHz may have reserved functions, 160 MHz continuous segments in the 5 GHz band may not be available. Accordingly, IEEE 802.11ac describes management frames for two modes of 160 MHz operation, namely, a contiguous 160 MHz operation mode and a non-contiguous 80 MHz+80 MHz operation mode. In many examples, APs and STAs capable of operating in modes with multiple, non-continuous segments may require additional hardware for the transmitter and receiver.

For next generation Wi-Fi technology and for operation at new, less crowded bands (e.g., the 6 GHz band), the maximum data throughput may be increased to enable larger amounts of data to be transferred to between APs and connected STAs. The current IEEE protocol (e.g., IEEE 802.11ac) does not support operation modes with greater than 160 MHz total configured bandwidth.

Examples disclosed herein include methods and apparatus to allow access points and stations to operate with four segment operation modes. Examples disclosed herein include a contiguous one segment mode, a symmetric two segment mode, asymmetric two segment modes, asymmetric three segment modes, and a symmetric four segment mode. Examples disclosed herein include methods to modify the management frames to enable operation in 320 MHz modes. In some examples disclosed herein, a management frame containing a plurality of center frequency fields and channel width fields is transmitted from the access point. In some examples disclosed herein, a trigger frame containing a modified user info field and a common info field is transmitted from the access point.

Figure 1:
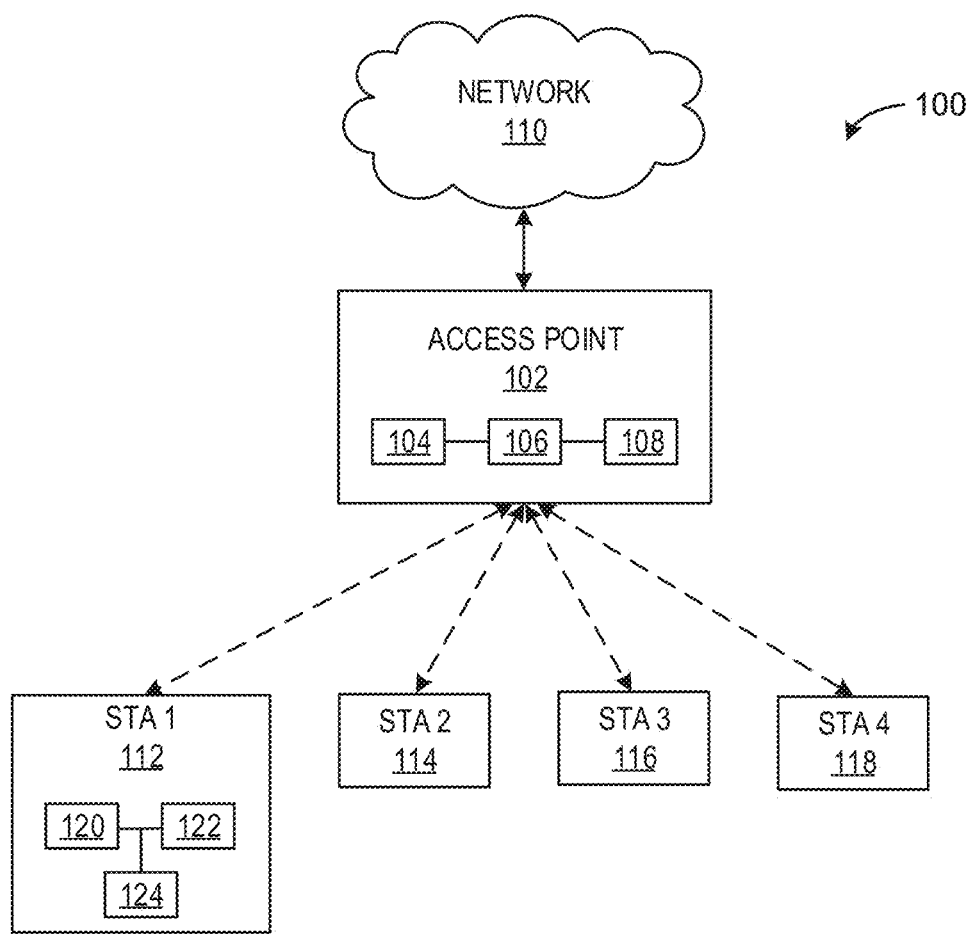
FIG. 1 is an illustration of a communication system utilizing wireless local area network protocols in which the teachings of this disclosure may be implemented.

FIG. 1 is an illustration of a communication system 100 utilizing wireless local area network protocols in which the teachings of this disclosure may be implemented. The example system 100 of FIG. 1 includes an example AP 102, an example application processor 104, an operation manager 106 and an example radio architecture 108, an example network 110 and example STAs 112-118, one of which is shown in further detail at reference numeral 112. The example AP 102 communicates with the example STA 112, which includes an example interface 120, example radio architecture 122 and an example frame processor 124.

The example AP 102 of FIG. 1 is a device allowing the example STAs 112-118 to wirelessly access the example network 110. The example AP 102 may be a router, a modem-router, and/or any other device that provides a wireless connection to the network 110. A router provides a wireless communication link to a STA. The router accesses the network 110 through a wire connection via a modem. A modem-router combines the functionalities of the modem and the router. The example AP 102 includes the example operation manager 106 to enable operation in 320 MHz operation modes.

The example application processor 104 of FIG. 1 generates data to be transmitted to a device and/or performs operations based on data extracted from one or more data packets. For example, the application processor 104 may be a MAC controller in the MAC layer of the AP 102. The application processor 104 instructs the example operation manager 106 to perform operations to enable 320 MHz basic service set (BSS) bandwidth configuration. Additionally, the application processor 104 receives data that has been received from a transmitting device (e.g., the example STAs 112-118). For example, the application processor 104 may receive synchronous data to synchronize itself with a connected device by setting a timer at the MAC layer.

The example operation manager 106 of the example AP 102 of the example system 100 of FIG. 1 determines which channels of AP 102 operation band are available and determines the bands and channels that will be configured as BSS bandwidth for 320 MHz operation. In some examples, after the configuration of BSS bandwidth is complete or substantially complete, the operation manager 106 determines the channels among the configured BSS bandwidth to be available. The example operation manager 106 is described in conjunction with FIG. 2. In some examples, the operation manager 106 additionally generates the management frames (e.g., a beacon frame, a trigger frame, etc.) to be transmitted by the radio architecture 108. In other examples, the management frames may be generated by any other suitable component of the AP 102. In some examples, all or part of the operation manager 106 can an external device to the AP 102. In other examples, all or part of the operation manager 106 can be implemented by the application processor 104.

The example radio architecture 108 transmits data from the AP 102 and receives data transmitted to the AP 102. In some examples, the radio architecture 108 facilitates communication between the AP 102 and STAs 112-118. The example radio architecture 108 is described below in further detail below in conjunction with FIG. 8.

The example network 110 of FIG. 1 is a system of interconnected systems exchanging data. The example network 110 may be implemented using any type of public or private network such as, but not limited to, the Internet, a telephone network, a local area network (LAN), a cable network, and/or a wireless network. To enable communication via the network 110, the example AP 102 includes a communication interface that enables a connection to an Ethernet, a digital subscriber line (DSL), a telephone line, a coaxial cable, or any wireless connection, etc. In some examples, the example network 110 provides the requested data to the operation manager 106 to be organized into data packets.

The example STAs 112-118 of FIG. 1 are Wi-Fi enabled computing devices. The example STAs 112-118 may be, for example, computing devices, portable devices, mobile devices, mobile telephones, smart phones, tablets, gaming systems, digital cameras, digital video recorders, televisions, set top boxes, e-book readers, automated systems, VR-enabled devices, and/or any other Wi-Fi enabled devices. The example STA 112 includes the example interface 120, the example STA radio architecture 122 and an example frame processor 124.

The example interface 120 of the STA 112 allows the frame processor 124 and the STA radio architecture 122 to communicate. In some examples, the interface 120 further allows communication with the frame processor 124 and communication to other elements of the STA 112 (e.g., an operating system, etc.). In some examples, the interface 120 may determine if a management frame (e.g., a beacon frame, a trigger frame, etc.) has been received by the STA radio architecture 122. In some examples, the interface 120 may request and transmit the uplink of data to the AP 102.

The example STA radio architecture 122 allows the STA 112 to send and receive transmissions from the AP 102. For example, the STA radio architecture 122 allows the STA 112 to connect with the AP 102. In some examples, the communication circuitry also transmits management frames from the STA 112 to the AP 102. In some examples, the STA radio architecture 122 allows the STA 112 to communicate with other STAs (e.g., the STAs 114-118, etc.). In some examples, the STA radio architecture 122 is physically similarly to the structure of radio architecture 108 as described in FIG. 8. In some examples, the STA radio architecture 122 and radio architecture 108 operate on different (e.g., separate) transmission and/or reception frequencies.

The example frame processor 124 processes the management frames received by the STA radio architecture 122 via the interface 120. In some examples, the frame processor 124 decodes received management frames (e.g., a beacon frame, etc.) to determine which channels the BSS is configured for BSS bandwidth, which can be 320 MHz, and notify operation manager 106. In some examples, the frame processor 124 processes the trigger frame to enable the synchronous transmission data with other STAs on the network (e.g., the STAs 112-118). In this example, the frame processor 124 may execute instructions that cause the STA 112 to prepare for simultaneous uplink (e.g., opens the appropriate filter).

Figure 2:
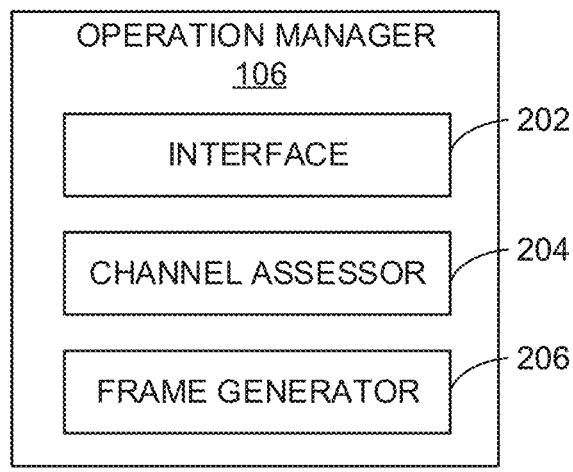
FIG. 2 is a block diagram of an example implementation of the operation manager of FIG. 1.

FIG. 2 is a block diagram of an example implementation of the operation manager 106 of FIG. 1. As disclosed herein the operation manager 106 is configured to facilitate four segment operation modes in wireless local area networks. The example operation manager 106 includes an example component interface 202, an example channel assessor 204, and an example frame generator 206.

The example interface 202 of FIG. 2 interfaces with components of the transmitting device (e.g., the example AP 102 of FIG. 1) to transmit and/or receive signals (e.g., instructions to generate management frames, instructions to generate data packets, etc.) from the example application processor 104 of FIG. 1. In some examples, when the example operation manager 106 is implemented in the AP 102, the interface 202 may instruct the example radio architecture 108 of FIGS. 1 and/or 8 to transmit data packets and/or management frames.

The example channel assessor 204 determines which channels of the Wi-Fi operation band are available to configure as BSS bandwidth for a 320 MHz operation mode. For example, if a contiguous 320 MHz channel is not available, the channel assessor 204 may identify a plurality of smaller channels (e.g., four, 80 MHz channels) as the configuration of the BSS bandwidth. For example, the example channel assessor 204 can instruct the radio architecture 108 to monitor which channels are in use by neighboring access points. Additionally or alternatively, the channel assessor 204 may instead contain a lookup table of reserved channels (e.g., for military use, etc.). In some examples, the channel assessor 204 can determine which channels to transmit and receive data over by inquiring a user of the network. In this example, the channel assessor 204 may prompt the user (e.g., the network administrator, etc.) to manually select which channel(s) to transmit the data over. In some examples, the channel assessor 204 may determine which channels to transmit and receive data over based on minimizing interference. Additionally, in some examples, the example channel assessor 204 can also determine which operational band(s) are appropriate for operation of the AP 102. For example, the channel assessor 204 may determine if the AP 102 is to operate in one or more of the 2.4 GHz band, 5 GHz band, 6 GHz band, etc.

The example frame generator 206 generates management, data, and control frame(s) for the AP 102. For example, the application processor 104 may request a management frame to establish, maintain, authenticate, associate and/or request communication from a STA. In some examples, management frames include fields which contain the relevant information contained in the frame. For example, the frame generator 206 may periodically generate a management frame (e.g. a beacon frame, an association response frame, an authentication frame, a reassociation response frame, etc.) to announce the presence of the AP 102 and relay information (e.g., a timestamp, a service set identifier (SSID), the BSS bandwidth of the AP 102, etc.) to STAs within range of the AP 102. In some examples, the example STAs 112-118 constantly scans for management frames. In the illustrated example, the frame generator 206 generates the fields of a management frame (e.g., a beacon frame) based on the BSS bandwidth the AP 102 will configure for transmitting and receiving data over. For example, one or more channel width fields and one or more center frequency segment fields can vary based on the selected BSS bandwidth). Additional detail in the formatting of the generated management frames is described below in conjunction with FIGS. 3A-3H.

The frame generator 206 may additionally generate control frames, such as a trigger frame, which is a type of control frame that triggers simultaneous uplink transmission from STAs. An example trigger frame is described below with conjunction with FIG. 4 and FIG. 5. In some examples, the frame generator 206 generates the fields of a trigger based on what channels the AP 102 will be transmitting and receiving data over. For example, one or more user info fields and resource allocation can vary based on the selected transmission channel(s).

Figure 4:
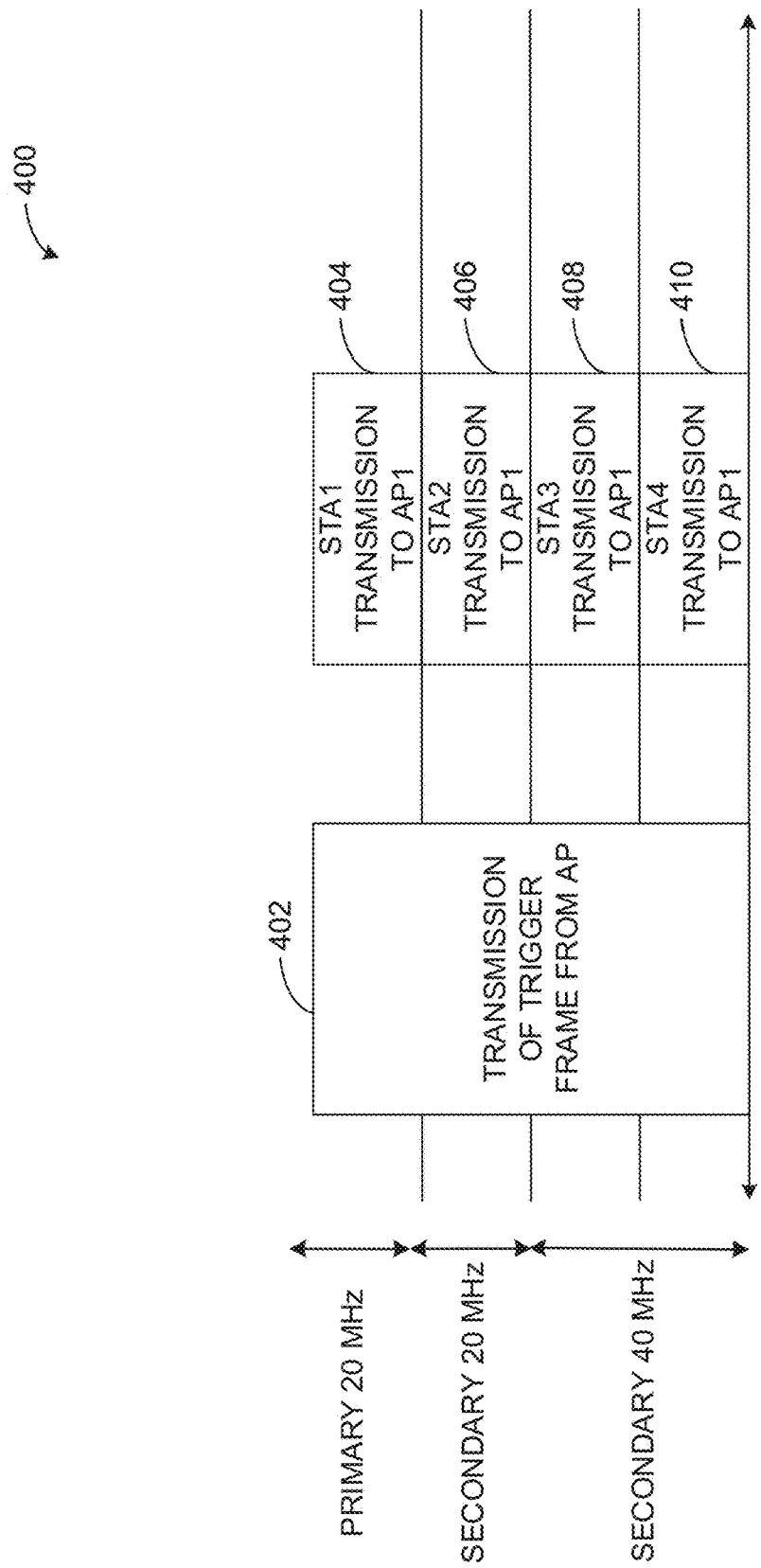
FIG. 4 is a diagram of an example transmission of a trigger frame from an access point (AP) to stations (STAs) in communication with the AP.

While an example manner of implementing the operation manager 106 of FIG. 1 is illustrated in FIG. 2, one or more of the elements, processes and/or devices illustrated in FIG. 4 may be combined, divided, re-arranged, omitted, eliminated and/or implemented in any other way. Further, the example interface 202, the example channel assessor 204, the example frame generator 206, the example packet generator 208, the example frequency segmenter 210 and/or, more generally, the example operation manager 106 of FIG. 1 may be implemented by hardware, software, firmware and/or any combination of hardware, software and/or firmware. Thus, for example, any of the example interface 202, the example channel assessor 204, the example frame generator 206, and/or, more generally, the example operation manager 106 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 202, the example channel assessor 204 and/or, the example frame generator 206, is/are hereby expressly defined to include a non-transitory computer readable storage device or storage disk such as a memory, a digital versatile disk (DVD), a compact disk (CD), a Blu-ray disk, etc. including the software and/or firmware. Further still, the example operation manager of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIGS. 3A-3H are examples of four segment operation modes and corresponding example values of an associated management frame including center frequency and channel width fields. The examples of FIGS. 3A-3H (e.g., the operation modes 300A-300H) illustrate the example fields of a management frame transmitted by an access point (e.g., the AP 102 of FIG. 1) operating in the operation mode of the respective examples. The examples of FIGS. 3A-3H additional can be divided into primary segments (e.g., primary segments 302A-302H), secondary segments (e.g., secondary segments 304A-302H), tertiary segments (e.g., tertiary segments 306A-306H) and quaternary segments (e.g., quaternary segments 308A-308H). In the illustrated examples of FIGS. 3A-3H, the primary segments 302A-302H, the secondary segments 304A-302H, the tertiary segments 306A-306H and the quaternary segments 308A-308H are 80 MHz in length. In the illustrated examples, the primary segments 302A-302H, the secondary segments 304A-302H, the tertiary segments 306A-306H and the quaternary segments 308A-308H are presented in a particular order. In other examples, the segments may be in any other order.

The examples of FIGS. 3A-3H illustrate the values (e.g., the locations) of a management frame with one or more elements including example new operation element channel width subfields (e.g., the NOECW subfields 310A-310H), example channel center frequency segment 0 subfields (e.g., the CCFS0 subfields 312A-312H), example channel center frequency segments 1 subfields (e.g., the CCFS1 subfields 314A-314H), example new channel center frequency segments 2 subfields (e.g., the NCCFS2 subfields 316A-316H) and example channel center frequency segments 3 subfields (e.g., the CCFS3 subfields 318D, 318E, 318G, 318H). In some examples, an example new second center frequency field (e.g., the NCCFS2 subfields 316A-316H), an example third center frequency field (e.g., the CCFS3 subfields 318D, 318E, 318G, 318H) and a new operation element channel width subfield (e.g., the NOECW subfields 310A-310H) can be included on a new element of a management frame, distinct from elements described in current IEEE protocols.

The example CCFS0 subfields 312A-312H represent the location of the center frequency of the primary 80 MHz segments 304A-304H. In some examples, the CCFS0 subfields 312A-312H represent the value of channel center frequency element 0 subfield of the very high throughput (VHT) basic service set (BSS) Operation element, as described in IEEE protocol 802.11ac.

The example CCF subfields 314A-314H represent the location of the center frequency of the secondary 80 MHz segment if the primary segment and secondary segment are not contiguous or the intersection of the primary segment and secondary segment if the primary segment and secondary segment are contiguous. In some examples, the CCFS1 subfields 314A-314H represent the value of the channel center frequency segment 1 subfield of the VHT Operation Element as described in IEEE protocol 802.11ac. In some examples, the CCFS2 subfields 314A-314H represent the value of the channel center frequency segment 2 subfield of the HT Operation Element as described in IEEE protocol 802.11.

The example NOECW subfields 310A-310H can be used to differentiate between the different operation modes 300A-300H of FIGS. 3A-3H. In some examples, the NOECW subfields 310A-310H indicate the operation bandwidth with channel width field in HT (high throughput) operation element and channel width field in the VHT operation element, as described in IEEE protocol 802.11 protocols. In some examples, the NOECW subfields 310A-310H can be in one or more subfields defined in the next generation Wi-Fi protocols. In some examples, the NOECW subfields 310A-310H can be included in the wide bandwidth channel switch element of a management frame, as defined in 9.4.2.161 of the IEEE 802.11-2016 standard to facilitate channel switch. In some examples, the NOECW subfields 310A-310H can be included in the wide channel bandwidth channel sub-element as defined in FIG. 9-302 of the IEEE 802.11-2016 standard. In some examples, a NOECW subfield value of "zero" indicates the access point is operating in a total channel bandwidth of less than 320 MHz. Alternatively, any value or set of values of the NOECW subfield may be used to indicate a total channel bandwidth of less than 320 MHz.

As used herein, "new operation element channel width" and "third channel width" are used interchangeable and to distinguish the example NOECW subfields 310A-310H from existing subfields described in the current IEEE protocols.

FIG. 3A is an illustration of an example single segment 320 MHz operation mode 300A for a BSS bandwidth with an example primary 80 MHz segment 302A, an example 80 Hz secondary segment 304A, and example tertiary 80 MHz segment 306A and an example quaternary segment 308A. In the illustrated example, the primary 80 MHz segment 302A, the example 80 Hz secondary segment 304A, the example tertiary 80 MHz segment 306A and the example quaternary segment 308A are contiguous and form an example single segment 318. The example single segment 320 MHz operation mode 300A has associated management frame (e.g., a beacon frame) with one or more elements including an example NOECW subfield 310A, an example CCFS0 subfield 312A, an example CCFS1 subfield 314A and an example NCCFS2 subfield 316A. In some examples, a CCFS3 subfield is not required to instruct a STA to operation in operation mode 300A. For example, in the illustrated example of FIG. 3A, a channel center frequency segment 3 is not included and has a subfield value of zero. Alternatively, the channel center frequency segment 3 may have any suitable value.

In the illustrated example of FIG. 3A, the example segments 302A-308A are identified in the management frame as a single contiguous 320 MHz channel as the single segment 318. The example illustrated management frame with one or more elements (e.g., the NOECW subfield 310A, the CCFS0 subfield 312A, the example CCFS1 subfield 314A, the example NCCFS2 subfield 316A) contains the information required to configure a STA to receive data transmitted from an access point configuring the BSS bandwidth as the example single segment 320 MHz operation mode 300A. In some examples, the management frame configuring the single segment operation mode 300A contains additional subfields. In the illustrated example, the NOECW subfield 310A has a value of one. In other examples, the NOECW subfield 310A may have any other suitable value to different the single segment 320 MHz operation mode 300A from other 320 MHz operation modes (e.g., the operation modes 300B-300H). The example CCFS0 subfield 312A represents the center frequency value of the primary segment 302A. The example CCFS1 subfield 314A value represents the intersection of the primary segment 302A and secondary segment 304A. Alternatively, the example CCFS1 subfield 314A may have any suitable value.

The example NCCFS2 subfield 316A represent the center frequency of the single segment 318 (e.g., the center frequency of the contiguous primary segment 302A, secondary segment 304A, primary segment 306A and quaternary segment 308A). Alternatively, the example NCCFS2 subfield 316A may have any other suitable value to indicate the center frequency of the single segment 318.

FIG. 3B is an illustration of an example two segment symmetric 320 MHz operation mode 300B for a BSS bandwidth with an example primary 80 MHz segment 302B, an example 80 Hz secondary segment 304B, and example tertiary 80 MHz segment 306B and an example quaternary segment 308B. In the illustrated example, the primary 80 MHz segment 302B and the example 80 Hz secondary segment 304B are contiguous and form an example first 160 MHz segment 320. In the illustrated example, the example tertiary 80 MHz segment 306B and the example quaternary segment 308B are contiguous and form an example second 160 MHz segment 322. The example two segment symmetric 320 MHz operation mode 300B is associated with a management frame (e.g., a beacon frame) with one or more elements including an example NOECW subfield 310B, an example CCFS0 subfield 312B, an example CCFS1 subfield 314B and an example NCCFS2 subfield 316B. In some examples, a CCFS3 subfield is not required to instruct a STA to operation in operation mode 300B. For example, in the illustrated example of FIG. 3B, a channel center frequency segment 3 subfield is not included and has a subfield value of zero. Alternatively, the channel center frequency segment 3 subfield may have any suitable value.

In the illustrated example of FIG. 3B, the example segments 302B-308B are identified in the management frame as two 160 MHz channels as the first 160 MHz segment 320 and the second 160 MHz segment 322. The example illustrated management frame with one or more elements (e.g., the NOECW subfield 310B, the CCFS0 subfield 312B, the example CCFS1 subfield 314B, the example NCCFS2 subfield 316B) contains the information required to configure a STA to receive data transmitted from an access point configuring the BSS bandwidth as the example two segment symmetric 320 MHz operation mode 300B. In some examples, the management frame configuring the two segment symmetric 320 MHz operation mode 300B contains additional subfields. In the illustrated example, the NOECW subfield 310B has a value of two. In other examples, the NOECW subfield 310B may have any other suitable value to different two segment symmetric 320 MHz operation mode 300B contains additional subfields from other 320 MHz operation modes (e.g., the operation modes 300A, 300C-300H). The example CCFS0 subfield 312B represents the center frequency value of the primary segment 302B. The example CCFS1 subfield 314B value represents the first 160 MHz segment 320 (e.g., the intersection of the primary segment 302B and secondary segment 304B). Alternatively, the example CCFS1 subfield may have any suitable value.

The example NCCFS2 subfield 316B represent the center frequency of the second 160 MHz segment 322 (e.g., the intersection of the tertiary segment 306B and the quaternary segment 308B). Alternatively, the example NCCFS2 subfield 316A may have any other suitable value to indicate the center frequency of the single segment 318.

FIG. 3C is an illustration of an example two segment asymmetric 320 MHz operation mode 300C for a BSS bandwidth with an example primary 80 MHz segment 302C, an example 80 Hz secondary segment 304C, and example tertiary 80 MHz segment 306C and an example quaternary segment 308C. In the illustrated example, the primary 80 MHz segment 302C is on a channel non-contiguous with the example 80 Hz secondary segment 304C, and the example tertiary 80 MHz segment 306C and the example quaternary segment 308C. In the illustrated example, the example secondary 80 MHz segment 304C, the example tertiary 80 MHz segment 306C and the example quaternary segment 308C are contiguous and form an example 240 MHz segment 326. The example two segment asymmetric 320 MHz operation mode 300C is associated with a management frame (e.g., a beacon frame) with one or more elements including an example NOECW subfield 310C, an example CCFS0 subfield 312C, an example CCFS1 subfield 314C and an example NCCFS2 subfield 316B. In some examples, a CCFS3 subfield is not required to instruct a STA to operation in operation mode 300C. For example, in the illustrated example of FIG. 3C, a channel center frequency segment 3 subfield is not included and has a subfield value of zero. Alternatively, the channel center frequency segment 3 subfield may have any suitable value.

In the illustrated example of FIG. 3C, the example segments 302C-308C are identified in the management frame as an 80 MHz and a 240 MHz channels as the primary segment 302C and the 240 MHz segment 326. The example illustrated management frame with one or more (e.g., the NOECW subfield 310C, the CCFS0 subfield 312C, the example CCFS1 subfield 314C, the example NCCFS2 subfield 316C) contains the information required to configure a STA to receive data transmitted from an access point configuring the BSS bandwidth as the example two segment asymmetric 320 MHz operation mode 300C. In some examples, the management frame configuring the two segment asymmetric 320 MHz operation mode 300C contains additional subfields. In the illustrated example, the NOECW subfield 310C has a value of one. In other examples, the NOECW subfield 310C may have any other suitable value to different two segment asymmetric 320 MHz operation mode 300C contains additional subfields from other 320 MHz operation modes (e.g., the operation modes 300A, 300B, 300D-300H). The example CCFS0 subfield 312C represents the center frequency value of the primary segment 302C. The example CCFS1 subfield 314C value represents the center frequency of the secondary segment 304C. Alternatively, the example CCFS1 may have any suitable value. The example NCCFS2 subfield 316C represent the center frequency of the secondary segment 304C and the tertiary segment 306C.

FIG. 3D is an illustration of an example two segment asymmetric 320 MHz operation mode 300D for a BSS bandwidth with an example primary 80 MHz segment 302D, an example 80 Hz secondary segment 304D, and example tertiary 80 MHz segment 306D and an example quaternary segment 308D. In the illustrated example, the quaternary 80 MHz segment 308D is on a channel non-contiguous with the example 80 Hz primary segment 302D, and the example secondary 80 MHz segment 304D and the example tertiary segment 306D. In the illustrated example, the example primary 80 MHz segment 302D, the example secondary 80 MHz segment 304D and the example tertiary segment 306D are contiguous and form an example 240 MHz segment 328. The example two segment asymmetric 320 MHz operation mode 300D is associated with a management frame (e.g., a beacon frame) with one or more elements including an example NOECW subfield 310D, an example CCFS0 subfield 312D, an example CCFS1 subfield 314D, an example NCCFS2 subfield 316D and example CCFS3 subfield 318D.

In the illustrated example of FIG. 3D, the example segments 302D-308D are identified in the management frame as an 80 MHz and a 240 MHz channels as the 240 MHz segment 328 and the quaternity segment 308D. The example illustrated management frame with one or more elements (e.g., the NOECW subfield 310D, the CCFS0 subfield 312D, the example CCFS1 subfield 314D, the example NCCFS2 subfield 316D, the example CCFS3 318D, etc.) contain the information required to configure a STA to receive data transmitted from an access point configuring the BSS bandwidth as the example two segment asymmetric 320 MHz operation mode 300D. In some examples, the management frame configuring the two segment asymmetric 320 MHz operation mode 300D contains additional subfields. In the illustrated example, the NOECW subfield 310D has a value of three. In other examples, the NOECW subfield 310C may have any other suitable value to different two segment asymmetric 320 MHz operation mode 300D contains additional subfields from other 320 MHz operation modes (e.g., the operation modes 300A-300C, 300E-300H). The example CCFS0 subfield 312D represents the center frequency value of the primary segment 302C. The example CCF subfield 314D represents the center frequency of the combined the secondary segment 304D and primary segment 302D (e.g., the intersection of the primary segment 302D and the secondary segment 304D). Alternatively, the example CCFS1 subfield may have any suitable value. The example NCCFS2 subfield 316D represents the center frequency of the secondary segment 304D and the tertiary segment 306D (e.g., the intersection of the secondary segment 304D and tertiary segment 306D). The example CCFS3 subfield 318D represents the center frequency of the quaternary segment 308D.

FIG. 3E is an illustration of an example three segment asymmetric 320 MHz operation mode 300E for a BSS bandwidth with an example primary 80 MHz segment 302E, an example 80 Hz secondary segment 304E, and example tertiary 80 MHz segment 306E and an example quaternary segment 308E. In the illustrated example, the tertiary 80 MHz segment 306E is on a channel non-contiguous with the example 80 Hz primary segment 302E, and the example secondary 80 MHz segment 304E and the example quaternary segment 308E. In the illustrated example, the quaternary 80 MHz segment 308E is on a channel non-contiguous with the example 80 Hz primary segment 302E, and the example secondary 80 MHz segment 304E and the example tertiary segment 306E. In the illustrated example, the example primary 80 MHz segment 302E and the example secondary 80 MHz segment 304E are contiguous and form an example 160 MHz segment 330. The example three segment asymmetric 320 MHz operation mode 300E is associated with a management frame (e.g., a beacon frame) with one or more elements including an example NOECW subfield 310E, an example CCFS0 subfield 312E, an example CCFS1 subfield 314E, an example NCCFS2 subfield 316E and example CCFS3 subfield 318E.

In the illustrated example of FIG. 3E, the example segments 302E-308E are identified in the management frame as two 80 MHz channels and a 160 MHz channel as the 160 MHz segment 330, tertiary segment 306E and the quaternity segment 308E. The example illustrated management frame with one or more elements subfields (e.g., the NOECW subfield 310E, the CCFS0 subfield 312E, the example CCFS1 subfield 314E, the example NCCFS2 subfield 316E, the example CCFS3 subfield 318E, etc.) contain the information required to configure a STA to receive data transmitted from an access point configuring the BSS bandwidth as the example three segment asymmetric 320 MHz operation mode 300E. In some examples, the management frame configuring the three segment asymmetric 320 MHz operation mode 300E contains additional subfields. In the illustrated example, the NOECW subfield 310E has a value of four. In other examples, the NOECW subfield 310C may have any other suitable value to different three segment asymmetric 320 MHz operation mode 300E contains additional subfields from other 320 MHz operation modes (e.g., the operation modes 300A-300D, 300F-300H). The example CCFS0 subfield 312E represents the center frequency value of the primary segment 302E. The example CCFS1 subfield 314E value represents the center frequency of the 160 MHz segment 330 (e.g., the intersection of the primary segment 302E and the secondary segment 304E). Alternatively, the example CCFS1 subfield 314E may have any suitable value. The example NCCFS2 subfield 316E represent the center frequency of the tertiary segment 306E. Alternatively, the example NCCFS2 subfield 316E may have any suitable value. The example CCFS3 subfield 318E represent the center frequency of the quaternary segment 308E. Alternatively, the example CCFS3 subfield 318E may have any suitable value.

FIG. 3F is an illustration of an example three segment asymmetric 320 MHz operation mode 300F for a BSS bandwidth with an example primary 80 MHz segment 302F, an example 80 Hz secondary segment 304F, and example tertiary 80 MHz segment 306F and an example quaternary segment 308F. In the illustrated example, the primary 80 MHz segment 302F is on a channel non-contiguous with the example 80 Hz secondary segment 304F, and the example tertiary 80 MHz segment 304F and the example quaternary segment 308F. In the illustrated example, the secondary 80 MHz segment 304F is on a channel non-contiguous with the example 80 Hz primary segment 302F, and the example tertiary 80 MHz segment 306F and the example quaternary segment 308F. In the illustrated example, the example tertiary 80 MHz segment 306F and the example quaternary 80 MHz segment 308F are contiguous and form an example 160 MHz segment 332. The example three segment asymmetric 320 MHz operation mode 300F is associated with a management frame (e.g., a beacon frame) with one or more elements including an example NOECW subfield 310F, an example CCFS0 subfield 312F, an example CCFS1 subfield 314F and an example NCCFS2 subfield 316F. In some examples, a CCFS3 subfield is not required to instruct a STA to operation in operation mode 300F. For example, in the illustrated example of FIG. 3F, a channel center frequency segment 3 subfield is not included and has a subfield value of zero. Alternatively, the channel center frequency segment 3 subfield may have any suitable value.

In the illustrated example of FIG. 3F, the example segments 302F-308F are identified in the management frame as two 80 MHz channels and a 160 MHz channel as the primary segment 302F and the secondary segment 304F and the 160 MHz segment 332. The example illustrated management frame with one or more elements (e.g., the NOECW subfield 310F, the CCFS0 subfield 312F, the example CCFS1 subfield 314F, the example NCCFS2 subfield 316F, etc.) contains the information required to configure a STA to receive data transmitted from an access point configuring the BSS bandwidth as the example three segment asymmetric 320 MHz operation mode 300F. In some examples, the management frame configuring the three segment asymmetric 320 MHz operation mode 300F contains additional subfields. In the illustrated example, the NOECW subfield 310F has a value of two. In other examples, the NOECW subfield 310C may have any other suitable value to different three segment asymmetric 320 MHz operation mode 300F contains additional subfields from other 320 MHz operation modes (e.g., the operation modes 300A-300E, 300G-300H). The example CCFS0 subfield 312F represents the center frequency value of the primary segment 302F. Alternatively, the example CCFS0 subfield 312F may have any suitable value. The example CCFS1 subfield 314F value represents the center frequency of the secondary segment 304E. Alternatively, the example CCFS1 subfield 314F may have any suitable value. The example NCCFS2 subfield 316F represent the center frequency of the 160 MHz segment (e.g., the intersection of the tertiary segment 306E and the quaternary segment 308E). Alternatively, the example NCCFS2 subfield 316F may have any suitable value.

FIG. 3G is an illustration of an example three segment asymmetric 320 MHz operation mode 300G for a BSS bandwidth with an example primary 80 MHz segment 302G, an example 80 Hz secondary segment 304G, and example tertiary 80 MHz segment 306G and an example quaternary segment 308G. In the illustrated example, the quaternary 80 MHz segment 308G is on a channel non-contiguous with the example 80 Hz primary segment 302G, and the example secondary 80 MHz segment 304G and the example tertiary segment 306G. In the illustrated example, the example secondary 80 MHz segment 306G and the example tertiary 80 MHz segment 306G are contiguous and form an example 160 MHz segment 334. The example three segment asymmetric 320 MHz operation mode 300G is associated with a management frame (e.g., a beacon frame) with one or more elements including an example NOECW subfield 310G, an example CCFS0 subfield 312G, an example CCFS1 subfield 314G, an example NCCFS2 316G and a CCFS3 subfield 318G.

In the illustrated example of FIG. 3G, the example segments 302G-308G are identified in the management frame as two 80 MHz channels and a 160 MHz channel as the primary segment 302G and the quaternary segment 304G and the 160 MHz segment 334. The example illustrated management frame with one or more elements (e.g., the NOECW subfield 310G, the CCFS0 subfield 312G, the example CCFS1 subfield 314G, the example NCCFS2 subfield 316G, the example CCFS3 subfield etc.) contain the information required to configure a STA to receive data from an access point using the example three segment asymmetric 320 MHz operation mode 300G. In some examples, the management frame configuring the three segment asymmetric 320 MHz operation mode 300G contains additional subfields. In the illustrated example, the NOECW subfield 310G has a value of three. In other examples, the NOECW subfield 310C may have any other suitable value to different three segment asymmetric 320 MHz operation mode 300G contains additional subfields from other 320 MHz operation modes (e.g., the operation modes 300A-300F, 300H). The example CCFS0 subfield 312G represents the center frequency value of the primary segment 302G. Alternatively, the example CCFS0 subfield 312G may have any suitable value. The example CCFS1 subfield 314G value represents the center frequency of the secondary segment 304G. Alternatively, the example CCFS1 subfield 314G may have any suitable value. The example NCCFS2 subfield 316G represent the center frequency of the 160 MHz segment 334 (e.g., the intersection of the secondary segment 304G and the tertiary segment 306G). Alternatively, the example NCCFS2 subfield 316G may have any suitable value. The example CCFS3 subfield 318G value represents the center frequency of the quaternary segment 308G. Alternatively, the example CCFS3 subfield 318G may have any suitable value.

FIG. 3H is an illustration of an example four segment symmetric 320 MHz operation mode 300H for a BSS bandwidth with an example primary 80 MHz segment 302H, an example 80 Hz secondary segment 304H, and example tertiary 80 MHz segment 306H and an example quaternary segment 308H. In the illustrated example, each of the primary 80 MHz segment 302H, the example 80 Hz secondary segment 304H, example tertiary 80 MHz segment 306H and quaternary segment 308H are on non-contiguous channels. The example three segment asymmetric 320 MHz operation mode 300H is associated with a management frame (e.g., a beacon frame) with one or more elements including an example NOECW subfield 310H, an example CCFS0 subfield 312H, an example CCFS1 subfield 314H, an example NCCFS2 316H and a CCFS3 subfield 318H.

In the illustrated example of FIG. 3H, the example segments 302H-308H are identified in the management frame as four non-contiguous 80 MHz channels. The example illustrated management frame with one or more elements (e.g., the NOECW subfield 310H, the CCFS0 subfield 312H, the example CCFS1 subfield 314H, the example NCCFS2 subfield 316H, the example CCFS3 subfield etc.) contains the information required to configure a STA to receive data transmitted from an access point configuring BSS bandwidth as the example three segment asymmetric 320 MHz operation mode 300H. In some examples, the management frame configuring the four segment symmetric 320 MHz operation mode 300H contains additional subfields. In the illustrated example, the NOECW subfield 310H has a value of four. In other examples, the NOECW subfield 310C may have any other suitable value to different four segment symmetric 320 MHz operation mode 300H contains additional subfields from other 320 MHz operation modes (e.g., the operation modes 300A-300G). The example CCFS0 subfield 312H represents the center frequency value of the primary segment 302H. Alternatively, the example CCFS0 subfield 312H may have any suitable value. The example CCFS1 subfield 314H value represents the center frequency of the secondary segment 304H. Alternatively, the example CCFS1 subfield 314H may have any suitable value. The example NCCFS2 subfield 316H represent the center frequency of the tertiary segment 306H. Alternatively, the example NCCFS2 subfield 316H may have any suitable value. The example CCFS3 subfield 318H value represents the center frequency of the quaternary segment 308H. Alternatively, the example CCFS3 subfield 318H may have any suitable value.

FIG. 4 is an example diagram 400 of an example transmission of a trigger frame 402 from an access point (AP) to stations (STAs) in communication with the AP. In the illustrated example, an access point (e.g., the AP 102 of FIG. 1) transmits a trigger frame over an 80 MHz channel to four STAs (e.g., the STAs 112-118 of FIG. 1). The example trigger frame 402 is a control frame which can be used to trigger simultaneous uplink transmission of STAs 112-118. In some examples, the trigger frame 402 can be used to transmit schedules to STAs to specify which STAs can transmit during a specified time. The example formatting of a trigger frame capable of supporting 320 MHz operation modes is described below in conjunction with FIGS. 5A-5D. In the illustrated example, the solicited STA(s) (e.g., the STAs 112-118 of FIG. 1) interpret the trigger frame to prepare for simultaneous uplink transmission.

Figure 5A:
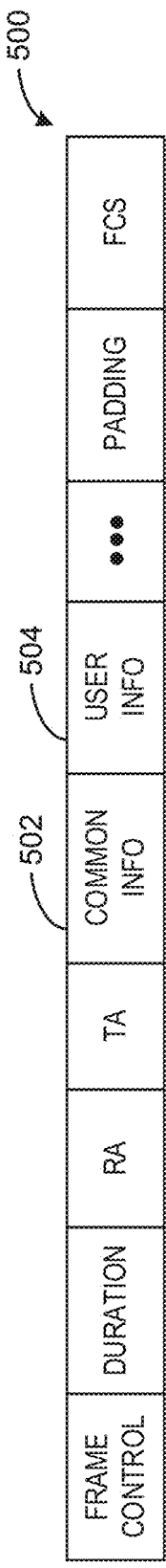
FIG. 5A is a diagram showing an example formatting of the example trigger frame of FIG. 4.

FIG. 5A is a diagram 500 showing an example formatting of the example trigger frame 402 of FIG. 4. In the illustrated example, the example trigger frame 402 contains a frame control field, duration field, RA field, TA field, common info field 502, user info field 504, a padding field and an FCS field. In some examples, the trigger frame 402 may be formatted with as described in the IEEE 802.11ax protocol with modifications to the common info field 502 and the user info field 504. In other examples, any other suitable modifications may be made to the trigger frame protocol of IEEE 802.11ax to support operation in 320 MHz operation modes.

Figure 5B:
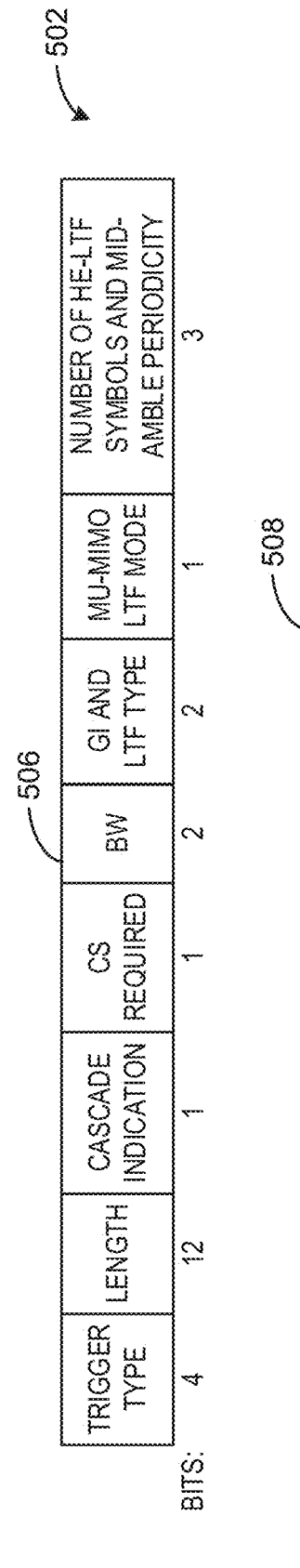
FIG. 5B is a diagram showing an example formatting of a common info field of the trigger frame of FIG. 4.

FIG. 5B is a diagram showing an example formatting of a common info field 502 of the trigger frame of FIG. 4. The example common info field 502 includes trigger type subfield, length subfield, cascade indication field, CS required field, bandwidth (BW) subfield 506, GI and LTF type subfield, MU-MIMO LTF mode subfield, number of HE-LTF symbols subfield, STBC subfield, LDPC extra symbol segment, AP TX Power subfield, packet extension subfield, spatial reuse subfield, doppler subfield, high efficiency signal field A (HE-SIG-A)

Reserved subfield 508, a reserved subfield and a trigger dependent common info subfield.

The value of the bits contained in the BW subfield 506 and HE-SIG-A Reserved subfield 508 indicate the bandwidth used by the transmitted trigger frame 402. For example, according to 802.11ax, the two bits of the example BW subfield 506 determines if the bandwidth of the transmitted trigger frame is 20 MHz (bits of '00'), 40 MHz (bits of "01"), 80 MHz (bits of "10") and 80+80 MHz/160 MHz (bits of "11"). In some examples, the number of bits of the BW subfield 506 must be expanded to support 320 MHz operation modes. For example, one or more bits of the nine bits HE-SIG-A Reserved subfield 508 may be allocated to BW subfield 506 to allow for additional bandwidths to be indicated therein. Alternatively, one or more bits of the HE-SIG-A subfield 508 may be allocated to a new subfield to indicate if the trigger frame is to operate in a 320 MHz operation mode.

For example, a one or more bit "BW extended" subfield may be allocated from the HE-SIG-A subfield 508. In some examples, if the BW extended subfield is one bit, if the bit is '1,' it is indicated that the trigger frame 402 is to operate in a 320 MHz operation mode (e.g., the operation modes 300A-300H). In this example, if the BW extended subfield is '0,' it may be indicated that the trigger frame 402 is to operate in an operation mode with a bandwidth less than or equal to 160 MHz. Alternatively, in some examples, the "BW extended" subfield may be more than one bit to allow indication of 320 MHz operation modes and 240 MHz operation modes. For example, one entry except all 1 may indicate all operation modes of 320 MHz (e.g., the operation modes 300C-300H), one entry except all 1 may indicate a contiguous 320 MHz operation mode (e.g., operation mode 300A), one entry except all 1 may indicate 160 MHz+160 MHz operation mode (e.g., operation mode 300B), one entry except all 1 may indicate 240 MHz operation modes and one entry except all one may indicate a 240 MHz contiguous operation mode. In some examples, if the field is not set to all 1, the BW field 506 of Trigger frame 402 if legacy HE STA is allocated with resource utilization that covers primary 80 MHz or secondary MHz in the signaling of the trigger frame 402. In other examples, any suitable formatting may be used for the BW extended subfield.

Figure 5C:
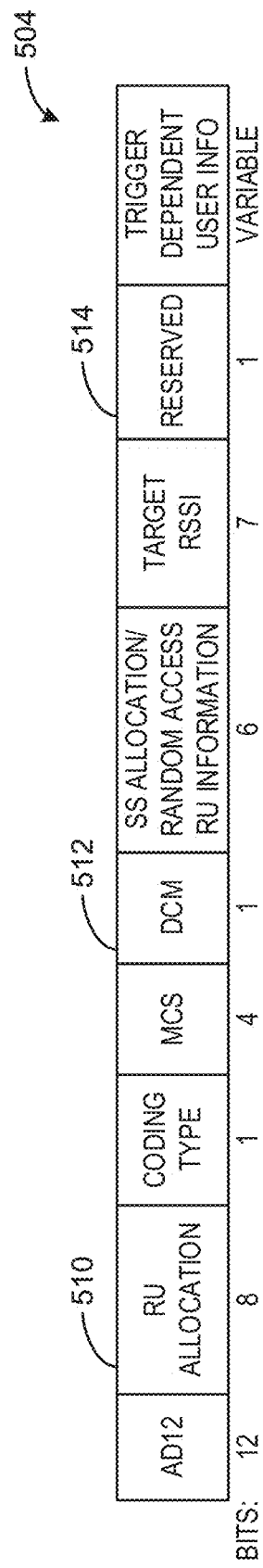
FIG. 5C is a diagram showing an example formatting of a user info field of the example trigger frame of FIG. 4.

FIG. 5C is a diagram showing an example formatting of a user info field 504 of the example trigger frame of FIG. 4. The example user info field 504 includes an AD12 subfield, a RU allocation subfield 510, a coding type subfield, an MCS subfield, a DCM subfield 512, a SS allocation/random access resource utilization information subfield, a target RSSI subfield, a reserved subfield 514 and a trigger dependent user info. The values of the bits of the RU allocation subfields 510, DCM subfield 512 and reserved subfield 514 may be modified to enable the trigger frame 402 to operate in a 320 MHz operation mode. The RU allocation subfield 510 is a control information subfield that indicates the resource utilization of the access point to the solicited STA indicated by the User Info field. In the current 802.11ax, the encoding the of the eight bits of the RU allocation subfield 510 determine the resource allocation indicated by the trigger frame 402.

Figure 5D:
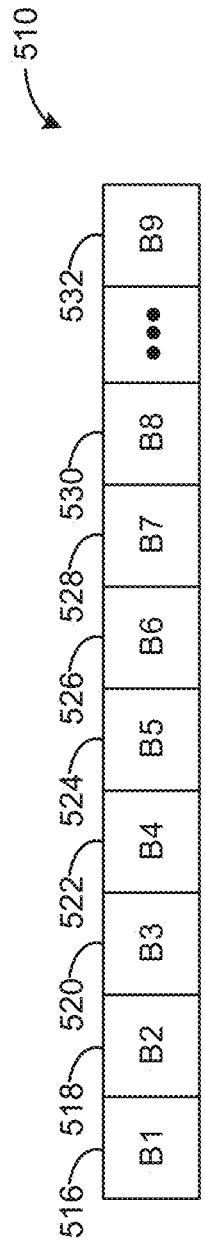
FIG. 5D is a diagram showing an example bit structure of the resource allocation subfield of the user info field of FIG. 5C and/or an example formatting of a resource allocation subfield in a control information subfield of uplink multi-user response scheduling (UMRS) information.

FIG. 5D is a diagram showing an example bit structure of the resource allocation subfield of the user info field of FIG. 5C and/or an example formatting of a resource allocation subfield in a control information subfield of uplink multi-user response scheduling (UMRS) information. The RU allocation subfield 510 is composed an example first bit 516, an example second bit 518, an example third bit 520, an example fourth bit 522, an example fifth bit 524, an example sixth bit 526, an example seventh bit 528 and an example eighth bit 530. In some examples disclosed herein, the RU allocation subfield 510 may be appended by an additional example ninth bit 532. In some examples, the UMRS control information uses the same formatting as the RU allocation subfield 510. UMRS information is a signaling in A-control subfield of the HE variant HT control field to trigger uplink multi-user transmission (e.g., HE trigger-based PLCP Protocol Data Unit (PPDU)). Accordingly, the modifications to the RU allocation subfield 510 of the trigger frame described in conjunction with FIG. 5C can similarly be applied to the RU allocation subfield of the UMRS control information. In this disclosure, "uplink multi-user response scheduling" (UMRS) and "triggered response scheduling" (TRS) are used interchangeably.

The example ninth bit 532 may be allocated from the DCM subfield 512. In other examples, the ninth bit 532 may be allocated from the reserved subfield 514. Alternatively, the ninth bit 532 may instead be allocated from any appropriate subfield of the trigger frame 402. The example bits 518-530 may be used to represent any number between 0 and 128 by manipulating if each of the example bits 516-530 is '0' or '1.' For example, the example RU allocation subfield may have a value of '29' if the example second bit 518, the example third bit 520 and the example seventh bit are '0' and the example fourth bit 522, the example fifth bit 524, the example sixth bit 526 and the example eighth bit 530 are '1' (e.g., a binary value of 00011101). In the 802.11ax protocol, the example first bit can be used to if the RU is 160 MHz (e.g., 2×966 tone RU). In the 802.11ax protocol, values of 0 to 36 represent possible 26-tone RU cases in 80 MHz, values of 37 to 52 represent possible 52-tone RU cases sin 80 MHz, values of 53-60 represent possible 106-tone RU cases in 80 MHz, values of 61-64 represent possible 242-tone RU cases in 80 MHz and values of 65-66 represent possible 996-tone RU allocation cases. The values of 69-127 are reserved.

To enable the trigger frame 402 to operate in a 320 MHz operation mode, the RU allocation subfield 510 and/or, more generally, the user info field 504 can be modified from the 802.11ax protocol. In some examples, the RU allocation subfield 510 is only modified if the BW subfield 506 indicates the trigger frame 402 is to operate in a 320 MHz operation. For example, some of or all of the 26-tonne RU allocation indications (e.g., values 0-36) may be to allow indications of larger indications. In some examples, the first bit 516 can be used to indicate if the RU allocation is in the first primary 160 MHz or the secondary 160 MHz. Alternatively, any other bit may be used to indicate if the RU allocation is the first primary 160 MHz or the secondary 160 MHz. In some examples, the second bit 518 may be used to further define if the RU allocation is in the primary, secondary or tertiary, quaternary 80 MHz (e.g., the segments 302H-308H of FIG. 3H). For example, if the RU allocation is in the primary 160 MHz, the second bit 518 may be used to indicate if the RU allocation is the primary or secondary 80 MHz. For example, if the RU allocation is the secondary 160 MHz, the second bit 518 may be used to indicate if the RU allocation is in the tertiary or quaternary 80 MHz.

In some examples, the bits 520-530 can be used to indicate possible RU-cases (e.g., a total 64 entries). For example, 16 values can be used to indicate 52-tone RU allocation in 80 MHz, 8 values can be used to indicate 106-tone RU allocation in 80 MHz, 4 values can be used for the indication of 242-tone RU allocation in 80 MHz, 2 values can be used for the indication of 484-tone RU allocation in 80 MHz, 1 entry can be used for the indication of 996-tone RU allocation in 80 MHz, 1 value can be used for the indication of 2×996-tone RU allocation in 160 MHz, 1 entry can be used for the indication of 4×996-tone RU allocation in 320 MHz, 4 entries can be used for 26-tones RU allocation to represent the center 26-tone of each 20 MHz and 1 entry can be used for 26-tones RU allocation to represent the center 26-tone RU of 80 MHz. In other examples, any suitable values may be used to represent RU allocation in the trigger frame 402 in 320 MHz operation modes.

In other examples, as described above, an additional ninth bit 532 may be allocated. In some examples, the additional ninth bit 532 may be contiguous to the bits 516-530. In other examples, the ninth bit 532 may not be contiguous to the bits 516-530. In some examples, the ninth bit 532 may form all or a portion of an RU allocation extension subfield on the user info field 504. In this example, the ninth bit 532 can be used to indicate if the RU allocation is in the primary 160 MHz or the secondary 160 MHz. In this example, any one of the bits 516-530 may be used to indicate in the RU allocation is in the primary, secondary, tertiary or quart nary 80 MHz.

In some examples, the trigger frame 402 may be formatted in a manner not illustrated in the FIGS. 5A-5D. In some examples, more bits may be added to the trigger frame 402 to enable indicate of larger bandwidths or RU allocations.

Figure 6:
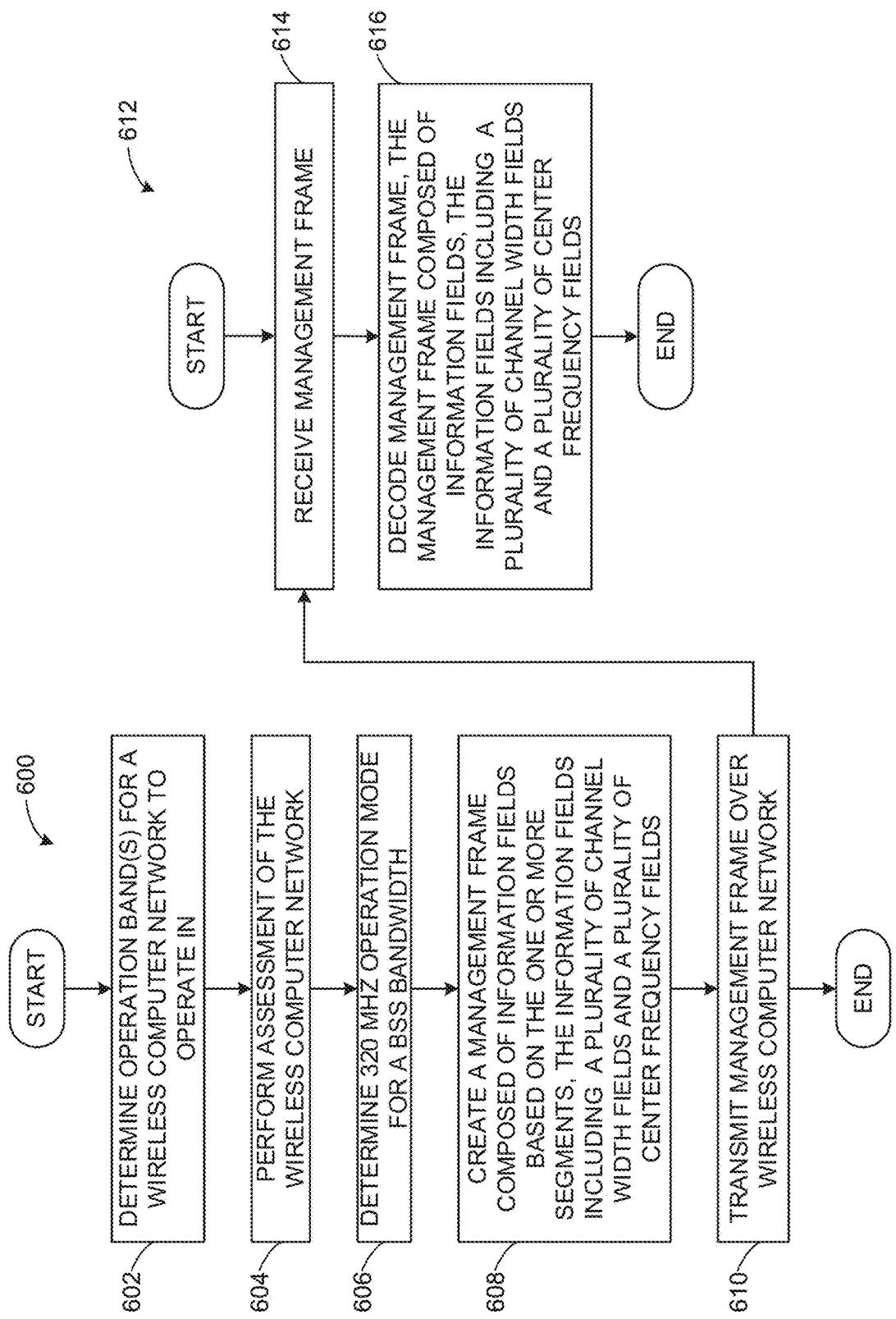
FIGS. 6-7 are an example flowcharts representative of machine readable instructions that may be executed to implement the AP and the STAs of FIG. 1.
Figure 7:
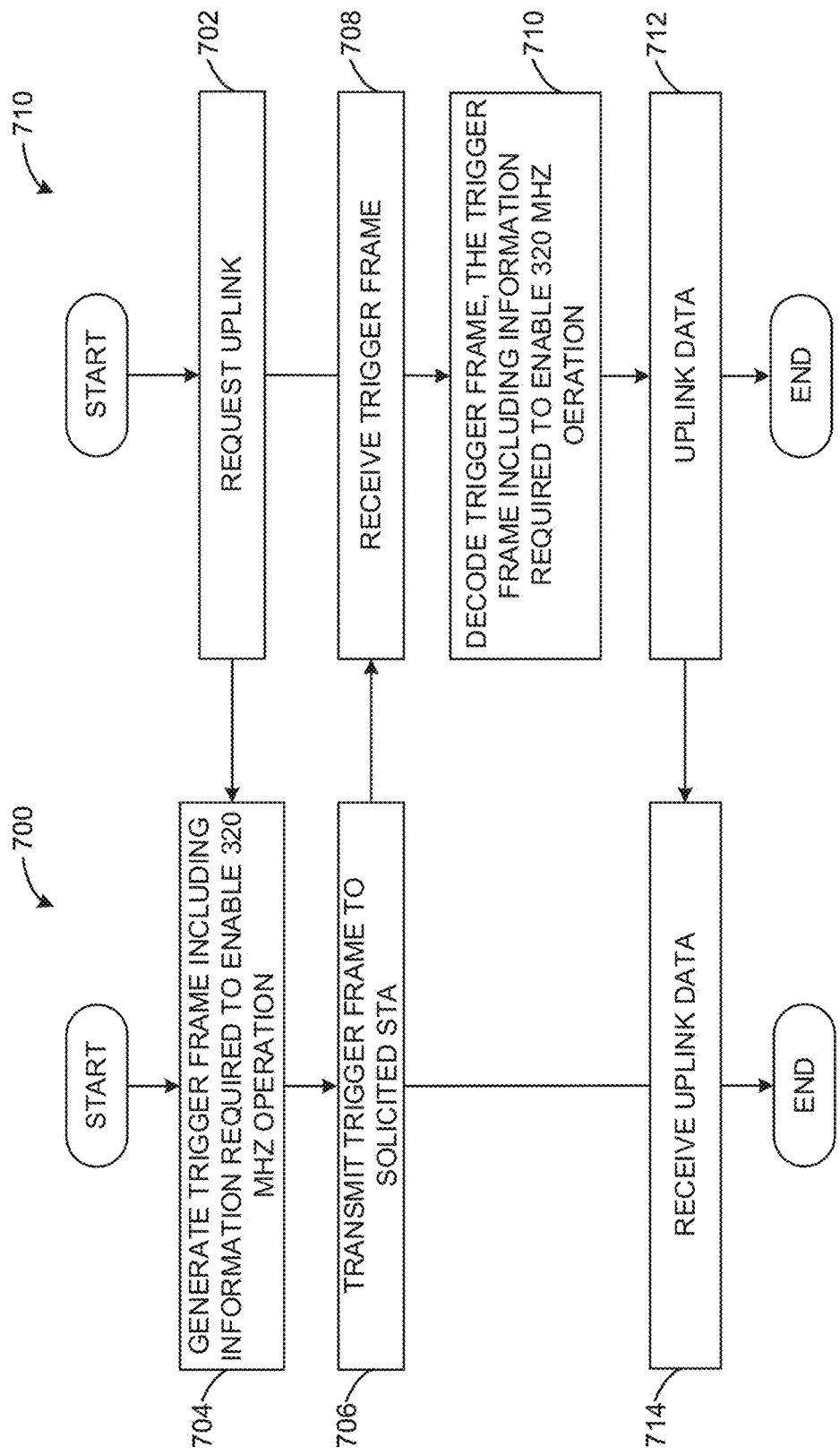

A flowchart representative of example hardware logic, machine readable instructions, hardware implemented state machines, and/or any combination thereof for implementing the example AP 102 and/or the example STA(s) 112-118 of FIGS. 1 and 2 are shown in FIGS. 6 and 7. The machine-readable instructions may be an executable program or portion of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 6 and 7, many other methods of implementing the example AP 102 and/or STA 112 may alternatively be used. For example, the order of execution of the blocks may be changed, and/or some of the blocks described may be changed, eliminated, or combined. Additionally or alternatively, any or all the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 9:
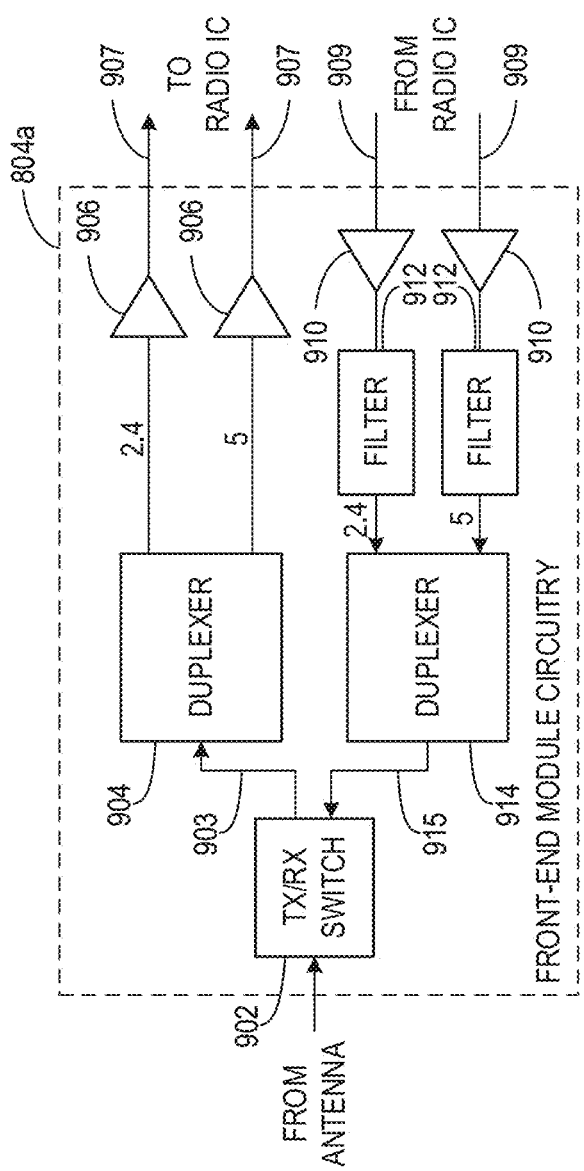
FIG. 9 illustrates example front-end module circuitry for use in the radio architecture of FIG. 8 in accordance with some examples.

FIG. 6 is an example flowchart 600 representative of machine readable instructions which may be executed by the AP 102 of FIGS. 1 and 2 to enable 320 MHz operation modes for wireless local area networks. Additionally, FIG. 9 illustrates an example flowchart 612 representative of machine readable instructions that may be executed by the example STA 112 of FIG. 1 to enable 320 MHz operation modes for wireless local area networks in response to communication from the AP 102. Although the examples of FIG. 6 are described in conjunction with the example AP 102 and STA 112 in the network of FIG. 1, the instructions may be executed by any type of access point and/or STA in any wireless communication environment. The flowchart 600 begins at block 602.

At block 602, the application processor 104 determines the operation band(s) of the wireless computer to operate in. For example, the application processor 104 may determine if the access point is to operate in the 2.4 GHz, 3.6 GHz, 4.9 GHz, 5 GHz, 5.9 GHz and/or any other suitable band (e.g., a 6 GHz or 7 GHz band) operation band. In some examples, the application processor 104 may interface with the channel assessor 204 of the operation manager 106 to determine which channels are available for transmission (e.g., performs a clear channel assessment (CCA)). In this example, the application processor 104 can then determine the operation band of AP 102 based on the availability of channels within the operation band. Additionally or alternatively, the application processor 104 may determine the operation band based a user input and/or setting. At block 604, the channel assessor 204 performs a CCA for the determined network. For example, the channel assessor 204 may determine which channels in the determined are idle or not idle. In some examples, the application processor 104 may determine that multiple operation bands may be used. For example, the application processor 104 may configure BSS bandwidth on channels in adjacent operation bands (e.g., the 5 GHz band and the 6 GHz band, etc.).

At block 606, the application processor 104 determines the 320 MHz operation modes (e.g., the modes 300A-300H of FIGS. 3A-3H, respectively) for a BSS bandwidth for the AP 102 is to operate in. For example, the application processor 104 may interface with the channel assessor 204 (e.g., via the interface 202 of FIG. 2) to determine which of the channels in the operation band are idle. In some examples, the application processor may determine the operation mode based on a user selection or input. In some examples, the application processor 104 may determine the BSS bandwidth of the primary 80 MHz segment 302A-302H, the secondary 80 MHz segment 304A-304H, the tertiary 80 MHz segment 306A-306H and the quaternary 80 MHz segment 308A-308H.

At block 608, the frame generator 206 creates a management frame composed of information fields based on the one or more segments, the information fields including a plurality of channel width fields and a plurality of center frequency fields. For example, the frame generator 206 may create the management frame based on determined operation mode and the BSS bandwidth. In some examples, the information fields (e.g., the NOECW subfields 310A-310H, CCFS0 subfields 312A-312H, CCFS1 subfields 314A-314H, the NCCFS2 subfields 316A-316H) are given values based on the selection operation mode and/or associated transmission channels of the primary, secondary, tertiary and quaternary segments (e.g., the primary 80 MHz segment 302A-302H, the secondary 80 MHz segment 304A-304H, the tertiary 80 MHz segment 306A-306H and the quaternary 80 MHz segment 308A-308H). At block 610, the radio architecture 108 transmits the management frame over a wireless computer network. After block 610, the process 600 ends.

The process 612 begins at block 614. At block 614, the STA radio architecture 122 receives the management frame transmit by the AP 102. At block 616, the frame processor 124 decodes the received management frame, the management frame composed of information fields, the information fields including a plurality of channel width fields and a plurality of center frequency fields. In some examples, the information fields (e.g., the NOECW subfields 310A-310H, the CCFS0 subfields 312A-312H, the CCFS1 subfields 314A-314H, the NCCFS2 subfields 316A-316H) are given values based on the operation mode and/or associated transmission channels of the access point (e.g., the primary 80 MHz segment 302A-302H, the secondary 80 MHz segment 304A-304H, the tertiary 80 MHz segment 306A-306H and the quaternary 80 MHz segment 308A-308H). In some examples, the management frame indicates other information required to receive and upload information to and from the access point. After block 616, the process 600 ends.

FIG. 7 is an example flowchart 700 representative of machine readable instructions which may be executed by the AP 102 of FIGS. 1 and 2 to enable 320 MHz operation modes for wireless area networks. Additionally, FIG. 9 illustrates an example flowchart 710 representation of machine readable instructions that may be executed by the example STA 112 of FIG. 1 to enable 320 MHz operation modes for wireless area networks in response to communication from the AP 102. Although the examples of FIG. 7 are described in conjunction with the example AP 102 and STA 112 in the network of FIG. 1, the instructions may be executed by any type of access point and/or STA (e.g., the STAS 114-118 of FIG. 1) in any wireless communication environment. The flowchart 710 begins at block 700 and the flowchart 700 begins at block 702.

At block 702, the STA 112 requests at uplink transmission to the AP 102. For example, the STA 112 may transmit a frame requesting the uplink of data to the AP 102. At block 704, the frame generator 206 generates the trigger frames including information required to enable 320 MHz operation. For example, the trigger frame may be formatted in accordance with one or more samples of FIGS. 5A-5D. In some examples, the frame generator 206 may instead generate UMRS control information.

At block 706, the radio architecture 108 transmits the trigger frame (e.g., the trigger frame 402) to the solicited STA (e.g., the STA executing the flowchart 700). Additionally or alternatively, if UMRS control information was generated, the radio architecture 108 may also transmit the UMRS control information.

At block 708, the STA radio architecture 122 receives the transmitted trigger frame. At block 712, the frame processor 124 decodes the trigger frame 402. For example, the trigger frame may be formatted as described above in conjunction with 5A-5D. For example, the frame processor 124 may instruct the STA 112 to prepare for uplink by opening the appropriate filter. In some examples, the trigger frame 402 to determine the resource unit allocation and timing of the upload. In some examples, the trigger frame may indicate when and which channels the STA 112 is transmit the upload information to the access point. At block 714, the interface 120 instructs the communication circuitry to transmit the uplink data to the AP 102. The process 710 ends. At block 714, the radio architecture 108 receives the uplink data and the process 700 ends.

Figure 8:
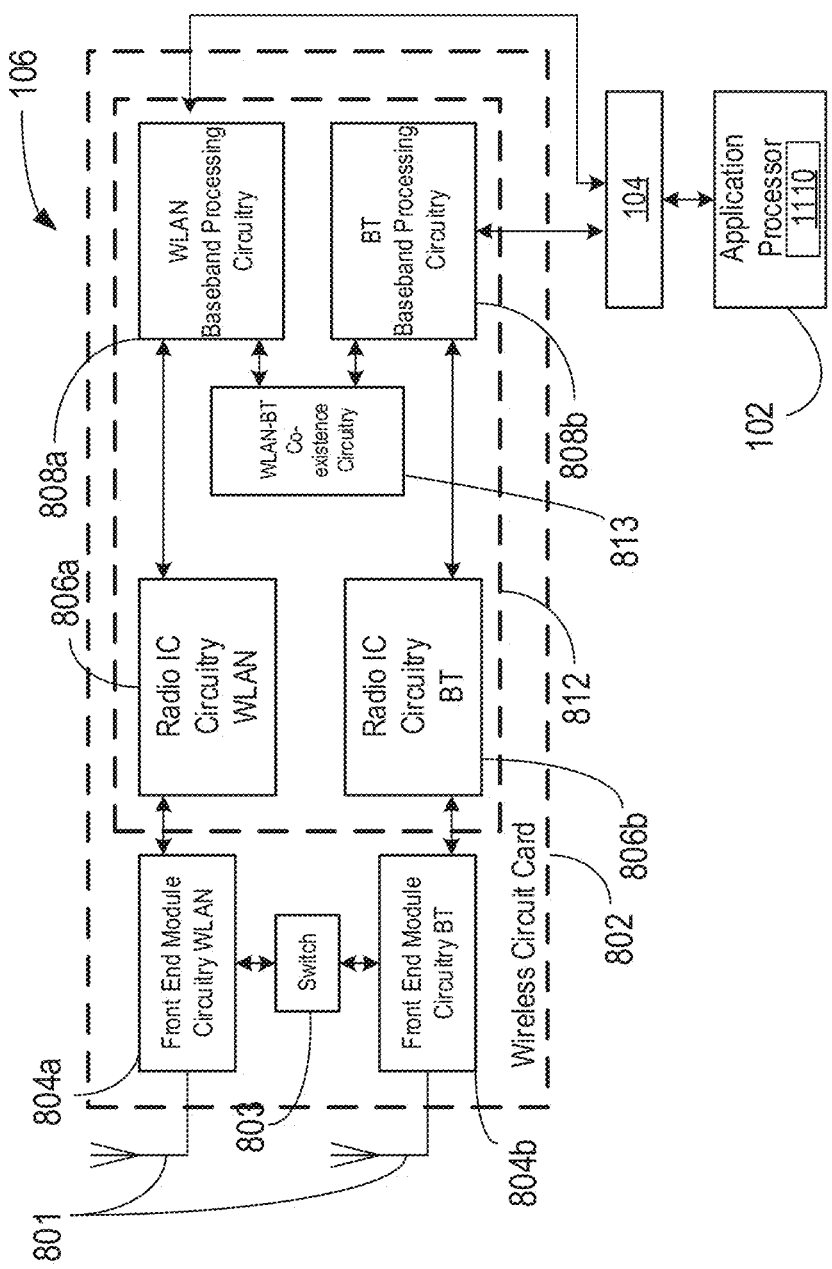
FIG. 8 is a block diagram of a radio architecture in accordance with some examples.

FIG. 8 is a block diagram of a radio architecture 108 in accordance with some embodiments that may be implemented in the example AP 102. Radio architecture 108 may include radio front-end module (FEM) circuitry 804A-804B, radio IC circuitry 806A-b and baseband processing circuitry 808A-808B. Radio architecture 108 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 804A-804B may include a WLAN or Wi-Fi FEM circuitry 804A and a Bluetooth (BT) FEM circuitry 804B. The WLAN FEM circuitry 804A may include a receive signal path comprising circuitry configured to operate on WLAN RF signals received from one or more antennas 801, to amplify the received signals and to provide the amplified versions of the received signals to the WLAN radio IC circuitry 806A for further processing. The BT FEM circuitry 804B may include a receive signal path which may include circuitry configured to operate on BT RF signals received from one or more antennas 801, to amplify the received signals and to provide the amplified versions of the received signals to the BT radio IC circuitry 806B for further processing. FEM circuitry 804A may also include a transmit signal path which may include circuitry configured to amplify WLAN signals provided by the radio IC circuitry 806A for wireless transmission by one or more of the antennas 801. In addition, FEM circuitry 804B may also include a transmit signal path which may include circuitry configured to amplify BT signals provided by the radio IC circuitry 806B for wireless transmission by the one or more antennas. In the embodiment of FIG. 8, although FEM 804A and FEM 804B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 806A-b as shown may include WLAN radio IC circuitry 1106a and BT radio IC circuitry 806B. The WLAN radio IC circuitry 806A may include a receive signal path which may include circuitry to down-convert WLAN RF signals received from the FEM circuitry 804A and provide baseband signals to WLAN baseband processing circuitry 808A. BT radio IC circuitry 806B may in turn include a receive signal path which may include circuitry to down-convert BT RF signals received from the FEM circuitry 804B and provide baseband signals to BT baseband processing circuitry 808B. WLAN radio IC circuitry 806A may also include a transmit signal path which may include circuitry to up-convert WLAN baseband signals provided by the WLAN baseband processing circuitry 808A and provide WLAN RF output signals to the FEM circuitry 804A for subsequent wireless transmission by the one or more antennas 801. BT radio IC circuitry 806B may also include a transmit signal path which may include circuitry to up-convert BT baseband signals provided by the BT baseband processing circuitry 808B and provide BT RF output signals to the FEM circuitry 804B for subsequent wireless transmission by the one or more antennas 801. In the embodiment of FIG. 8, although radio IC circuitries 806A and 806B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 808A and 808B may include a WLAN baseband processing circuitry 808A and a BT baseband processing circuitry 808B. The WLAN baseband processing circuitry 808A may include a memory, such as, for example, a set of RAM arrays in a Fast Fourier Transform or Inverse Fast Fourier Transform block (not shown) of the WLAN baseband processing circuitry 808A. Each of the WLAN baseband circuitry 808A and the BT baseband circuitry 808B may further include one or more processors and control logic to process the signals received from the corresponding WLAN or BT receive signal path of the radio IC circuitry 806A-B, and to also generate corresponding WLAN or BT baseband signals for the transmit signal path of the radio IC circuitry 1106A and 1106B. Each of the baseband processing circuitries 808A and 808B may further include physical layer (PHY) and medium access control layer (MAC) circuitry, and may further interface with the example operation manager 106 for generation and processing of the frames and data packets and for controlling operations of the radio IC circuitry 806A-b.

Referring still to FIG. 8, according to the shown embodiment, WLAN-BT coexistence circuitry 813 may include logic providing an interface between the WLAN baseband circuitry 808A and the BT baseband circuitry 808B to enable use cases requiring WLAN and BT coexistence. In addition, a switch 803 may be provided between the WLAN FEM circuitry 804A and the BT FEM circuitry 804B to allow switching between the WLAN and BT radios according to application needs. In addition, although the antennas 801 are depicted as being respectively connected to the WLAN FEM circuitry 804A and the BT FEM circuitry 804B, embodiments include within their scope the sharing of one or more antennas as between the WLAN and BT FEMs, or the provision of more than one antenna connected to each of FEM 804A or 804B.

In some embodiments, the front-end module circuitry 804A-804B, the radio IC circuitry 806A-b, and baseband processing circuitry 808A-808B may be provided on a single radio card, such as wireless radio card 802. In some other embodiments, the one or more antennas 801, the FEM circuitry 804A-804B and the radio IC circuitry 806A and 806B may be provided on a single radio card. In some other embodiments, the radio IC circuitry 806A and 806B and the baseband processing circuitry 808A-808B may be provided on a single chip or integrated circuit (IC), such as IC 812.

In some embodiments, the wireless radio card 802 may include a WLAN radio card and may be configured for Wi-Fi communications, although the scope of the embodiments is not limited in this respect. In some of these embodiments, the radio architecture 108 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 108 may be part of a Wi-Fi communication station (STA) such as a wireless access point (AP), a base station or a mobile device including a Wi-Fi device. In some of these embodiments, radio architecture 108 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 108 may also be suitable to transmit and/or receive communications in accordance with other techniques and standards.

In some embodiments, the radio architecture 108 may be configured for high-efficiency Wi-Fi (HEW) communications in accordance with the IEEE 802.11ax standard. In these embodiments, the radio architecture 108 may be configured to communicate in accordance with an OFDMA technique, although the scope of the embodiments is not limited in this respect.

In some other embodiments, the radio architecture 108 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 8, the BT baseband circuitry 808B may be compliant with a Bluetooth (BT) connectivity standard such as Bluetooth, Bluetooth 12.0 or Bluetooth 10.0, or any other iteration of the Bluetooth Standard. In embodiments that include BT functionality as shown for example in FIG. 8, the radio architecture 108 may be configured to establish a BT synchronous connection oriented (SCO) link and or a BT low energy (BT LE) link. In some of the embodiments that include functionality, the radio architecture 108 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 8, the functions of a BT radio card and WLAN radio card may be combined on a single wireless radio card, such as single wireless radio card 802, although embodiments are not so limited, and include within their scope discrete WLAN and BT radio cards.

In some embodiments, the radio architecture 108 may include other radio cards, such as a cellular radio card configured for cellular (e.g., 3GPP such as LTE, LTE-Advanced or 5G communications).

In some IEEE 802.11 embodiments, the radio architecture 108 may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

FIG. 9 illustrates WLAN FEM circuitry 804A in accordance with some embodiments. Although the example of FIG. 9 is described in conjunction with the WLAN FEM circuitry 804A, the example of FIG. 9 may be described in conjunction with the example BT FEM circuitry 804B (FIG. 11), although other circuitry configurations may also be suitable.

In some embodiments, the FEM circuitry 804A may include a TX/RX switch 902 to switch between transmit mode and receive mode operation. The FEM circuitry 904a may include a receive signal path and a transmit signal path. The receive signal path of the FEM circuitry 804A may include a low-noise amplifier (LNA) 906 to amplify received RF signals 903 and provide the amplified received RF signals 907 as an output (e.g., to the radio IC circuitry 806A-b of FIG. 8). The transmit signal path of the circuitry 804A may include a power amplifier (PA) to amplify input RF signals 909 (e.g., provided by the radio IC circuitry 806A-b of FIG. 8), and one or more filters 912, such as band-pass filters (BPFs), low-pass filters (LPFs) or other types of filters, to generate RF signals 915 for subsequent transmission (e.g., by one or more of the antennas 801 of FIG. 8) via an example duplexer 914.

In some dual-mode embodiments for Wi-Fi communication, the FEM circuitry 804A may be configured to operate in either the 2.4 GHz frequency spectrum or the 12 GHz frequency spectrum. In these embodiments, the receive signal path of the FEM circuitry 804A may include a receive signal path duplexer 904 to separate the signals from each spectrum as well as provide a separate LNA 906 for each spectrum as shown. In these embodiments, the transmit signal path of the FEM circuitry 804A may also include a power amplifier 910 and a filter 912, such as a BPF, an LPF or another type of filter for each frequency spectrum and a transmit signal path duplexer 904 to provide the signals of one of the different spectrums onto a single transmit path for subsequent transmission by the one or more of the antennas 801 of FIG. 8. In some embodiments, BT communications may utilize the 2.4 GHz signal paths and may utilize the same FEM circuitry 804A as the one used for WLAN communications.

Figure 10:
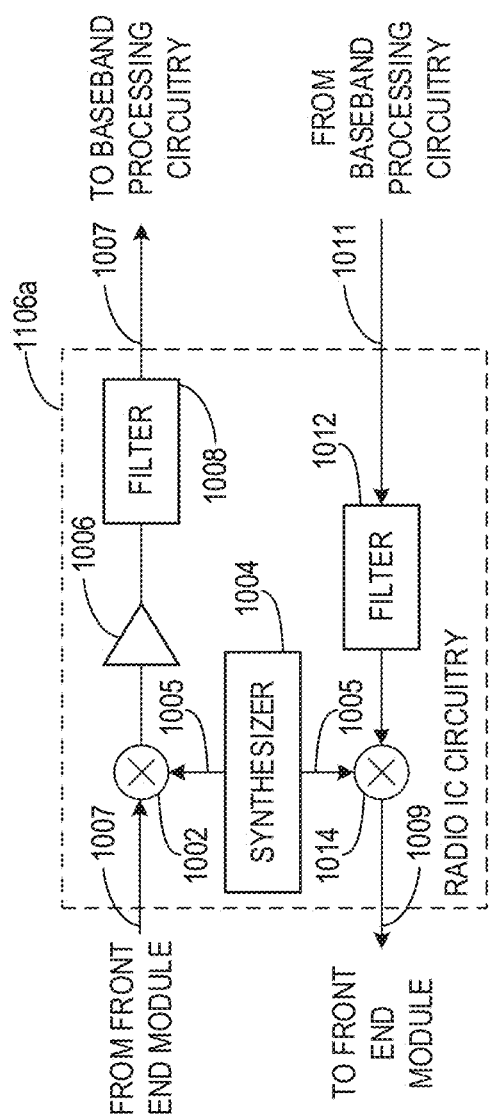
FIG. 10 illustrates example radio IC circuitry for use in the radio architecture of FIG. 8 in accordance with some examples.

FIG. 10 illustrates radio IC circuitry 806A in accordance with some embodiments. The radio IC circuitry 806A is one example of circuitry that may be suitable for use as the WLAN or BT radio IC circuitry 806A of FIG. 8, although other circuitry configurations may also be suitable. Alternatively, the example of FIG. 10 may be described in conjunction with the example BT radio IC circuitry 806B.

In some embodiments, the radio IC circuitry 806A may include a receive signal path and a transmit signal path. The receive signal path of the radio IC circuitry 806A may include at least mixer circuitry 1002, such as, for example, down-conversion mixer circuitry, amplifier circuitry 1006 and filter circuitry 1008. The transmit signal path of the radio IC circuitry 806A may include at least filter circuitry 1012 and mixer circuitry 1014, such as, for example, up-conversion mixer circuitry. Radio IC circuitry 806A may also include synthesizer circuitry 1004 for synthesizing a frequency 1005 for use by the mixer circuitry 1002 and the mixer circuitry 1014. The mixer circuitry 1002 and/or 1014 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 10 illustrates only a simplified version of a radio IC circuitry, and may include, although not shown, embodiments where each of the depicted circuitries may include more than one component. For instance, mixer circuitry 1014 may each include one or more mixers, and filter circuitries 1008 and/or 1012 may each include one or more filters, such as one or more BPFs and/or LPFs according to application needs. For example, when mixer circuitries are of the direct-conversion type, they may each include two or more mixers.

In some embodiments, mixer circuitry 1002 may be configured to down-convert RF signals 907 received from the FEM circuitry 904a-b of FIG. 8 based on the synthesized frequency 1005 provided by synthesizer circuitry 1004. The amplifier circuitry 1006 may be configured to amplify the down-converted signals and the filter circuitry 1008 may include an LPF configured to remove unwanted signals from the down-converted signals to generate output baseband signals 1007. Output baseband signals 1007 may be provided to the baseband processing circuitry 808A-808B of FIG. 8 for further processing. In some embodiments, the output baseband signals 1007 may be zero-frequency baseband signals, although this is not a requirement. In some embodiments, mixer circuitry 1002 may comprise passive mixers, although the scope of the embodiments is not limited in this respect.

In some embodiments, the mixer circuitry 1014 may be configured to up-convert input baseband signals 1011 based on the synthesized frequency 1005 provided by the synthesizer circuitry 1004 to generate RF output signals 909 for the FEM circuitry 804A-804B. The baseband signals 1011 may be provided by the baseband processing circuitry 808A-808B and may be filtered by filter circuitry 1012. The filter circuitry 1012 may include an LPF or a BPF, although the scope of the embodiments is not limited in this respect.

In some embodiments, the mixer circuitry 1002 and the mixer circuitry 1014 may each include two or more mixers and may be arranged for quadrature down-conversion and/or up-conversion respectively with the help of synthesizer 1004. In some embodiments, the mixer circuitry 1002 and the mixer circuitry 1014 may each include two or more mixers each configured for image rejection (e.g., Hartley image rejection). In some embodiments, the mixer circuitry 1002 and the mixer circuitry 1014 may be arranged for direct down-conversion and/or direct up-conversion, respectively. In some embodiments, the mixer circuitry 1002 and the mixer circuitry 1014 may be configured for super-heterodyne operation, although this is not a requirement.

Mixer circuitry 1002 may comprise, according to one embodiment: quadrature passive mixers (e.g., for the in-phase (I) and quadrature phase (Q) paths). In such an embodiment, RF input signal 907 from FIG. 9 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 1005 of synthesizer 1004 of FIG. 10. In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 907 of FIG. 9 may comprise a balanced signal, although the scope of the embodiments is not limited in this respect. The I and Q baseband output signals may be provided to low-noise amplifier, such as amplifier circuitry 1006 of FIG. 10 or to filter circuitry 1008 of FIG. 10.

In some embodiments, the output baseband signals 1007 and the input baseband signals 1011 may be analog baseband signals, although the scope of the embodiments is not limited in this respect. In some alternate embodiments, the output baseband signals 1007 and the input baseband signals 1011 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1004 may be a fractional-N synthesizer or a fractional N/N+1 synthesizer, although the scope of the embodiments is not limited in this respect as other types of frequency synthesizers may be suitable. For example, synthesizer circuitry 1004 may be a delta-sigma synthesizer, a frequency multiplier, or a synthesizer comprising a phase-locked loop with a frequency divider. According to some embodiments, the synthesizer circuitry 1004 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1004 may be provided by a voltage-controlled oscillator (VCO), although that is not a requirement. A divider control input may further be provided by either the baseband processing circuitry 808A-808B of FIG. 8 or a link aggregator depending on the desired output frequency 1005. In some embodiments, a divider control input (e.g., N) may be determined from a look-up table (e.g., within a Wi-Fi card) based on a channel number and a channel center frequency as determined or indicated by the link aggregator. The application processor 104 may include, or otherwise be connected to, the example operation manager 106 of FIG. 1. The application processor 104 includes an example timer 1110.

In some embodiments, synthesizer circuitry 1004 may be configured to generate a carrier frequency as the output frequency 1005, while in other embodiments, the output frequency 1005 may be a fraction of the carrier frequency (e.g., one-half the carrier frequency, one-third the carrier frequency). In some embodiments, the output frequency 1305 may be a LO frequency (fLO).

Figure 11:
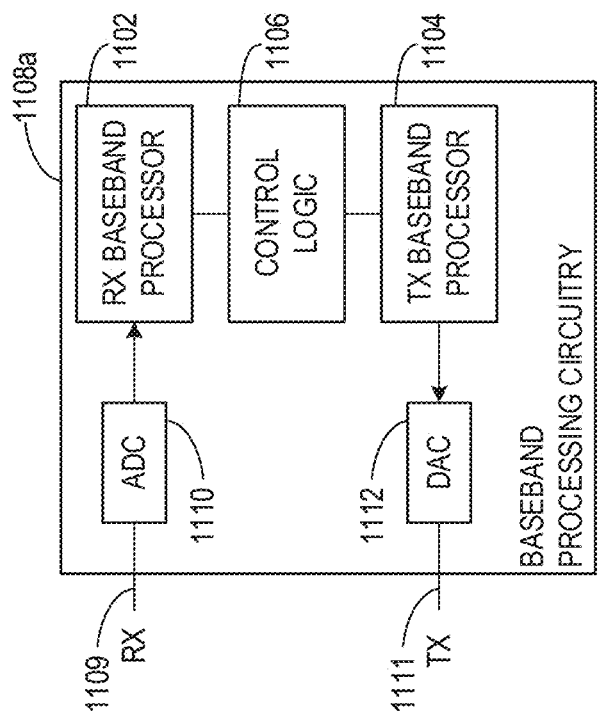
FIG. 11 illustrates example baseband processing circuitry for use in the radio architecture of FIG. 8 in accordance with some examples.

FIG. 11 illustrates a functional block diagram of baseband processing circuitry 808A in accordance with some embodiments. The baseband processing circuitry 808A is one example of circuitry that may be suitable for use as the baseband processing circuitry 808A of FIG. 11, although other circuitry configurations may also be suitable. Alternatively, the example of FIG. 10 may be used to implement the example BT baseband processing circuitry 808B of FIG. 8.

The baseband processing circuitry 808A may include a receive baseband processor (RX BBP) 1102 for processing receive baseband signals 1009 provided by the radio IC circuitry 806A-b of FIG. 8 and a transmit baseband processor (TX BBP) 1104 for generating transmit baseband signals 1011 for the radio IC circuitry 806A-b. The baseband processing circuitry 808A may also include control logic 1106 for coordinating the operations of the baseband processing circuitry 808A.

In some embodiments (e.g., when analog baseband signals are exchanged between the baseband processing circuitry 808A-808B and the radio IC circuitry 806A-b), the baseband processing circuitry 808A may include ADC 1110 to convert analog baseband signals 1109 received from the radio IC circuitry 806A-b to digital baseband signals for processing by the RX BBP 1102. In these embodiments, the baseband processing circuitry 808A may also include DAC 1112 to convert digital baseband signals from the TX BBP 1104 to analog baseband signals 1111.

In some embodiments that communicate OFDM signals or OFDMA signals, such as through baseband processor 808A, the transmit baseband processor 1104 may be configured to generate OFDM or OFDMA signals as appropriate for transmission by performing an inverse fast Fourier transform (IFFT). The receive baseband processor 1102 may be configured to process received OFDM signals or OFDMA signals by performing an FFT. In some embodiments, the receive baseband processor 1102 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 8, in some embodiments, the antennas 801 of FIG. 8 may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 801 may each include a set of phased-array antennas, although embodiments are not so limited.

Although the radio architecture 108 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 12:
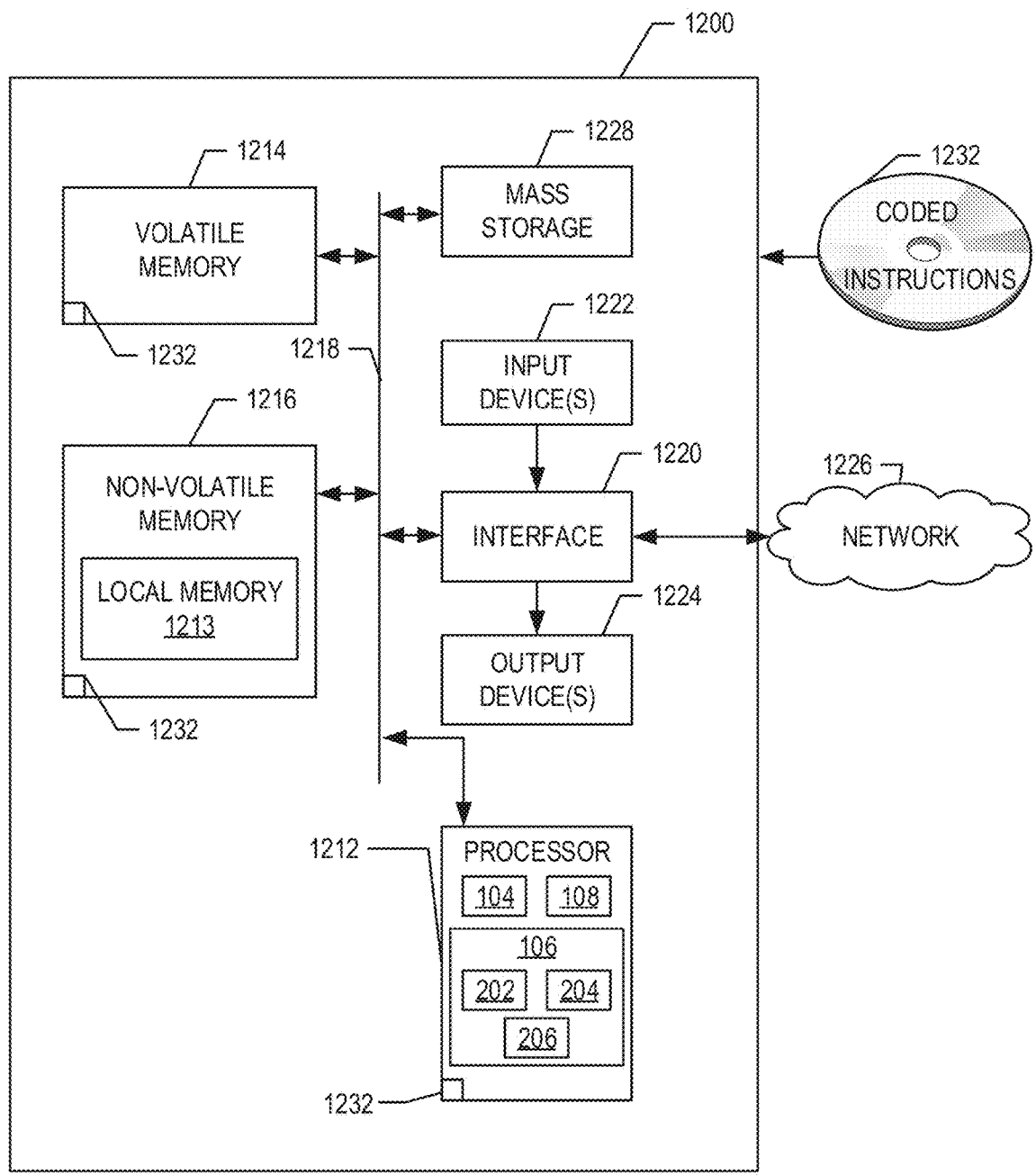
FIG. 12 is a block diagram of a processor platform structured to execute the example machine readable instructions of FIGS. 6 and 7 associated with the access point of FIG. 1 to implement the example access point of FIG. 1.

FIG. 12 is a block diagram of a processor platform 1200 structured to execute the example machine readable instructions of FIGS. 6 and 7 associated with the AP 102 of FIG. 1 to implement the example AP 102 of FIG. 1. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1212 implements the example application processor 104, the example operation manager 106, the example radio architecture 108, the example interface 202, the example channel assessor 204 and the example frame generator 206.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random-Access Memory (SDRAM), Dynamic Random-Access Memory (DRAM), RAMBUS® Dynamic Random-Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIG. 6 may be stored in the mass storage device 1228, in the volatile memory 1214, in the non-volatile memory 1216, and/or on a removable non-transitory computer readable storage medium such as a CD or DVD.

Figure 13:
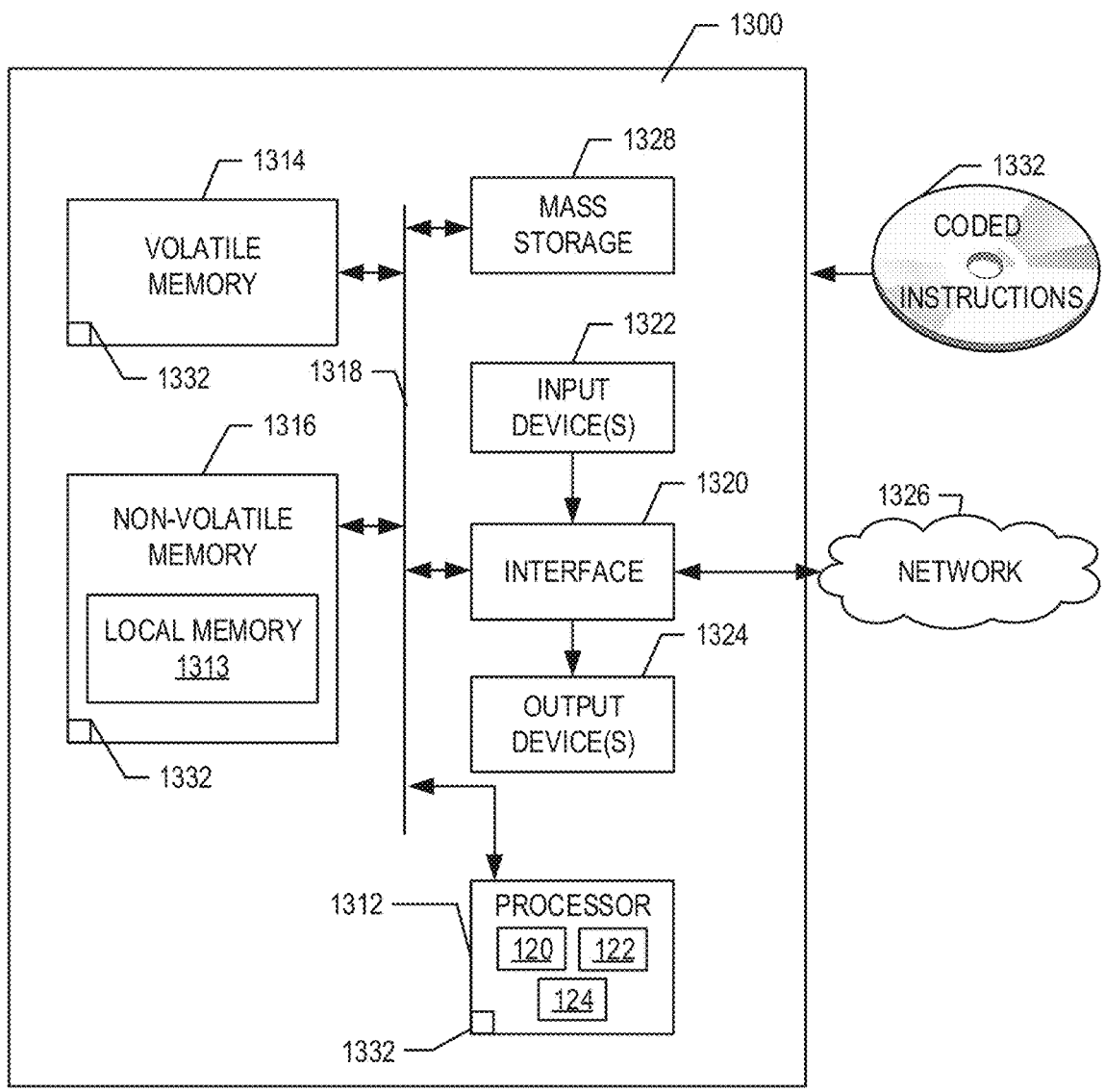
FIG. 13 is a block diagram of a processor platform structured to execute the example machine readable instructions of FIGS. 6 and 7 associated with the STAs of FIG. 1 to implement one or more of the example STAs of FIG. 1.

FIG. 13 is a block diagram of a processor platform structured to execute the example machine readable instructions of FIGS. 6 and 7 associated with the STAs 112-118 of FIG. 1 to implement one or more of the example STAs 112-118 of FIG. 1. The processor platform 1300 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1312 implements the example interface 120, the example STA radio architecture 122 and an example frame processor 124.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random-Access Memory (SDRAM), Dynamic Random-Access Memory (DRAM), RAMBUS® Dynamic Random-Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 6 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed that enable access points to operate in larger operation when available. When compared to the current Wi-Fi standards, the example disclosed here greatly increase the available throughput of wireless local area networks. In some examples, the increased throughput can be utilized to increase uplink and downlink of computing devices connected to WLANs.

Example 1 includes a method, comprising performing an assessment of a wireless network, determining an operation mode for a basic service set (BSS) bandwidth based on the assessment, the operation mode indicating continuity of a primary segment, a secondary segment, a tertiary segment and a quaternary segment, creating a management frame including information fields based on the BSS bandwidth, the information fields including a first channel width field, a second channel width field, a third channel width field, a first center frequency field, a second center frequency field and a third center frequency field, and transmitting the management frame over the wireless network.

Example 2 includes the method of example 1, further including determining one or more operation bands of the wireless network.

Example 3 includes the method of example 1, wherein the primary segment, the secondary segment, the tertiary segment, and the quaternary segment are continuous.

Example 4 includes the method of example 3, wherein the first channel width field is a first value, the second channel width field is the first value, the third channel width field is a second value, the first center frequency field is a nonzero value and the second center frequency field is a center frequency of the continuous segment.

Example 5 includes the method of example 1, wherein the primary segment and the secondary segment are continuous, and the tertiary segment and the quaternary segment are continuous.

Example 6 includes the method of example 5, wherein the first channel width field is a first value, the second channel width field is the first value, the third channel width field is a second value, the first center frequency field is a nonzero value and the second center frequency field is a center frequency of the tertiary segment and the quaternary segment.

Example 7 includes the method as in any one of examples 1-6, wherein the management frame includes a new element, the new element including the second center frequency field, the third center frequency field and the third channel width field.

Example 8 includes the method as in any one of examples 1-6, further including transmitting a frame to one or more STAs, the frame including (1) information to enable simultaneous transmission of data packets from the one or more STAs and (2) a bandwidth field with one or more bits in a reserved subfield in a common info field.

Example 9 includes the method of example 8, wherein the frame further includes a resource unit allocation subfield including a first bit to indicate if a resource unit allocation is included in a primary 160 MHz segment or a secondary 160 MHz segment.

Example 10 includes the method of example 9, wherein the resource unit allocation subfield further includes a second entry to indicate if the resource unit allocation is included in a continuous 320 MHz segment.

Example 11 includes a tangible computer readable storage medium, which, when executed, cause a machine to perform the method of any one of examples 1 through example 10 includes example 12 includes a tangible computer readable storage medium comprising instructions which, when executed, cause a processor to at least perform an assessment of a wireless network, determine an operation mode for a basic service set (bss) bandwidth based on the assessment, the operation mode indicating continuity of a primary segment, a secondary segment, a tertiary segment and a quaternary segment, create a management frame including information fields based on the bss bandwidth, the information fields including a first channel width field, a second channel width field, a third channel width field, a first center frequency field, a second center frequency field and a third center frequency field, and transmit the management frame over the wireless network.

Example 13 includes the tangible computer readable storage medium of example 12, wherein the instructions further cause the processor to determine one or more operation bands of the wireless network.

Example 14 includes the tangible computer readable storage medium of example 12, wherein the primary segment, the secondary segment, the tertiary segment, and the quaternary segment are continuous.

Example 15 includes the tangible computer readable storage medium of example 14, wherein the first channel width field is a first value, the second channel width field is the first value, the third channel width field is a second value, the first center frequency field is a nonzero value and the second center frequency field is a center frequency of the continuous segment.

Example 16 includes the tangible computer readable storage medium of example 12, wherein the primary segment and the secondary segment are continuous, and the tertiary segment and the quaternary segment are continuous.

Example 17 includes the tangible computer readable storage medium of example 16, wherein the first channel width field is a first value, the second channel width field is the first value, the third channel width field is a second value, the first center frequency field is a nonzero value and the second center frequency field is a center frequency of the tertiary segment and the quaternary segment.

Example 18 includes the tangible computer readable storage medium as in any one of examples 12-17, wherein the management frame includes a new element, the new element including the second center frequency field, the third center frequency field and the third channel width field.

Example 19 includes the tangible computer readable storage medium as in any one of examples 12-17, wherein the instructions further cause the processor to transmit a frame to one or more STAs, the frame including (1) information to enable simultaneous transmission of data packets from the one or more STAs and (2) a bandwidth field with one or more bits in a reserved subfield in a common info field.

Example 20 includes the tangible computer readable storage medium of example 19, wherein the frame further includes a resource unit allocation subfield including a first bit to indicate if a resource unit allocation is included in a primary 160 MHz segment or a secondary 160 MHz segment.

Example 21 includes the tangible computer readable storage medium of example 20, wherein the resource unit allocation subfield further includes a second entry to indicate if the resource unit allocation is included in a continuous 320 MHz segment.

Example 22 includes an apparatus, comprising a channel assessor to perform an assessment of a wireless network, an application processor to determine an operation mode for a basic service set (bss) bandwidth based on the assessment, the operation mode indicating continuity of a primary segment, a secondary segment, a tertiary segment and a quaternary segment, a frame generator to create a management frame including information fields based on the bss bandwidth, the information fields including a first channel width field, a second channel width field, a third channel width field, a first center frequency field, a second center frequency field and a third center frequency field, and radio architecture to transmit the management frame over the wireless network.

Example 23 includes the apparatus of example 22, wherein the application processor is further to determine one or more operation bands of the wireless network.

Example 24 includes the apparatus of example 22, wherein the primary segment, the secondary segment, the tertiary segment, and the quaternary segment are continuous.

Example 25 includes the apparatus of example 24, wherein the first channel width field is a first value, the second channel width field is the first value, the third channel width field is a second value, the first center frequency field is a nonzero value and the second center frequency field is a center frequency of the continuous segment.

Example 26 includes the apparatus of example 22, wherein the primary segment and the secondary segment are continuous, and the tertiary segment and the quaternary segment are continuous.

Example 27 includes the apparatus of example 26, wherein the first channel width field is a first value, the second channel width field is the first value, the third channel width field is a second value, the first center frequency field is a nonzero value and the second center frequency field is a center frequency of the tertiary segment and quaternary segment.

Example 28 includes the apparatus as in any one of examples 22-27, wherein the management frame includes a new element, the new element including the second center frequency field, the third center frequency field and the third channel width field.

Example 29 includes the apparatus as in any one of examples 22-27, wherein the frame generator is further to create a frame including (1) information to enable simultaneous transmission of data packets from one or more STAs and (2) a bandwidth field with one or more bits in a reserved subfield in a common info field.

Example 30 includes the apparatus of example 29, wherein the frame further includes a resource unit allocation subfield including a first bit to indicate if a resource unit allocation is included in a primary 160 MHz segment or a secondary 160 MHz segment.

Example 31 includes the apparatus of example 30, wherein the resource unit allocation subfield further includes a second entry to indicate if the resource unit allocation is included in a continuous 320 MHz segment. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
performing an assessment of a wireless network;
determining an operation mode for a basic service set (BSS) bandwidth based on the assessment, the operation mode indicating continuity of a primary segment, a secondary segment, a tertiary segment and a quaternary segment;
creating a management frame including information fields based on the BSS bandwidth, the information fields including a first channel width field, a second channel width field, a third channel width field, a first center frequency field, a second center frequency field and a third center frequency field; and
transmitting the management frame over the wireless network.

2. The method of claim 1, wherein the primary segment, the secondary segment, the tertiary segment, and the quaternary segment are a continuous segment.

3. The method of claim 2, wherein the first channel width field is a first value, the second channel width field is the first value, the third channel width field is a second value, the first center frequency field is a nonzero value and the second center frequency field is a center frequency of the continuous segment.

4. The method of claim 1, wherein the primary segment and the secondary segment are continuous, and the tertiary segment and the quaternary segment are continuous.

5. The method of claim 4, wherein the first channel width field is a first value, the second channel width field is the first value, the third channel width field is a second value, the first center frequency field is a nonzero value and the second center frequency field is a center frequency of the tertiary segment and the quaternary segment.

6. The method of claim 1, wherein the management frame includes a new element, the new element including the second center frequency field, the third center frequency field and the third channel width field.

7. The method of claim 1, further including transmitting a frame to one or more STAs, the frame including (1) information to enable simultaneous transmission of data packets from the one or more STAs and (2) a bandwidth field with one or more bits in a reserved subfield in a common info field.

8. A non-transitory computer readable storage medium comprising instructions which, when executed, cause a processor to at least:

perform an assessment of a wireless network;

determine an operation mode for a basic service set (BSS) bandwidth based on the assessment, the operation mode indicating continuity of a primary segment, a secondary segment, a tertiary segment and a quaternary segment;

create a management frame including information fields based on the BSS bandwidth, the information fields including a first channel width field, a second channel width field, a third channel width field, a first center frequency field, a second center frequency field and a third center frequency field; and transmit the management frame over the wireless network.

9. The non-transitory computer readable storage medium of claim 8, wherein the primary segment, the secondary segment, the tertiary segment, and the quaternary segment are a continuous segment.

10. The non-transitory computer readable storage medium of claim 9, wherein the first channel width field is a first value, the second channel width field is the first value, the third channel width field is a second value, the first center frequency field is a nonzero value and the second center frequency field is a center frequency of the continuous segment.

11. The non-transitory computer readable storage medium of claim 10, wherein the primary segment and the secondary segment are continuous, and the tertiary segment and the quaternary segment are continuous.

12. The non-transitory computer readable storage medium of claim 11, wherein the first channel width field is a first value, the second channel width field is the first value, the third channel width field is a second value, the first center frequency field is a nonzero value and the second center frequency field is a center frequency of the tertiary segment and the quaternary segment.

13. The non-transitory computer readable storage medium of claim 8, wherein the management frame includes a new element, the new element including the second center frequency field, the third center frequency field and the third channel width field.

14. The non-transitory computer readable storage medium of claim 8, wherein the instructions further cause the processor to transmit a frame to one or more STAs, the frame including (1) information to enable simultaneous transmission of data packets from the one or more STAs and (2) a bandwidth field with one or more bits in a reserved subfield in a common info field.

15. An apparatus, comprising:

a channel assessor to perform an assessment of a wireless network;

an application processor to determine an operation mode for a basic service set (BSS) bandwidth based on the assessment, the operation mode indicating continuity of a primary segment, a secondary segment, a tertiary segment and a quaternary segment;

a frame generator to create a management frame including information fields based on the BSS bandwidth, the information fields including a first channel width field, a second channel width field, a third channel width field, a first center frequency field, a second center frequency field and a third center frequency field; and radio architecture to transmit the management frame over the wireless network.

16. The apparatus of claim 15, wherein the primary segment, the secondary segment, the tertiary segment, and the quaternary segment are a continuous segment.

17. The apparatus of claim 16, wherein the first channel width field is a first value, the second channel width field is the first value, the third channel width field is a second value, the first center frequency field is a nonzero value and the second center frequency field is a center frequency of the continuous segment.

18. The apparatus of claim 15, wherein the primary segment and the secondary segment are continuous, and the tertiary segment and the quaternary segment are continuous.

19. The apparatus of claim 18, wherein the first channel width field is a first value, the second channel width field is the first value, the third channel width field is a second value, the first center frequency field is a nonzero value and the second center frequency field is a center frequency of the tertiary segment and quaternary segment.

20. The apparatus of claim 15, wherein the frame generator is further to create a frame including (1) information to enable simultaneous transmission of data packets from one or more STAs and (2) a bandwidth field with one or more bits in a reserved subfield in a common info field.

* * * * *